(12) United States Patent
Talla et al.

(10) Patent No.: US 11,843,450 B2
(45) Date of Patent: Dec. 12, 2023

(54) DUPLEX LONG RANGE BACKSCATTER WIRELESS COMMUNICATION SYSTEMS AND METHODS

(71) Applicant: Jeeva Wireless Inc., Seattle, WA (US)

(72) Inventors: Vamsi Talla, Seattle, WA (US); Mohamad Katanbaf, Seattle, WA (US); Anthony Weinand, Seattle, WA (US); Jonathan Hamberg, Renton, WA (US)

(73) Assignee: Jeeva Wireless Inc., Seattle, WA (US)

( * ) Notice: Subject to any disclaimer, the term of this patent is extended or adjusted under 35 U.S.C. 154(b) by 282 days.

(21) Appl. No.: 17/302,816

(22) Filed: May 12, 2021

(65) Prior Publication Data

US 2021/0359754 A1    Nov. 18, 2021

Related U.S. Application Data

(60) Provisional application No. 63/025,022, filed on May 14, 2020.

(51) Int. Cl.
*H04B 7/22* (2006.01)
*G06K 7/10* (2006.01)
*H04L 5/14* (2006.01)

(52) U.S. Cl.
CPC ........... *H04B 7/22* (2013.01); *G06K 7/10297* (2013.01); *H04L 5/14* (2013.01)

(58) Field of Classification Search
CPC .......... H04B 7/22; H04B 1/10; H04B 5/0062; H04B 5/02; H04B 1/02; H04B 1/06; G06K 7/10297; G06K 7/0008; H04L 5/14; H04L 27/12; H04L 27/14

See application file for complete search history.

(56) References Cited

U.S. PATENT DOCUMENTS

| | | | |
|---|---|---|---|
| 5,406,146 A | 4/1995 | Connell et al. | |
| 5,694,414 A | 12/1997 | Smith et al. | |
| 6,509,836 B1 * | 1/2003 | Ingram | G01S 13/825 340/572.7 |
| 9,287,624 B2 * | 3/2016 | Wan | H01Q 1/2216 |
| 9,438,279 B2 * | 9/2016 | Feldman | H04B 1/0458 |
| 9,948,446 B2 * | 4/2018 | van Liempd | H04B 7/0469 |

(Continued)

OTHER PUBLICATIONS

International Search Report and Written Opinion for International Application No. PCT/US2021/032061 dated Oct. 19, 2021, in 23 pages.

*Primary Examiner* — Brian E Miller
(74) *Attorney, Agent, or Firm* — Knobbe, Martens, Olson & Bear, LLP

(57) ABSTRACT

Systems and methods for a full-duplex backscatter system. An example method includes outputting, via a transmitter of the backscatter system, a single tone carrier for transmission via an antenna of the backscatter system. A tunable impedance network is tuned via a microcontroller to reduce self-interference associated with the signal tone carrier by at least a threshold level, with the tunable impedance network including passive elements which are configured to be tuned, and with the self-interference reduction by the threshold level being in the analog domain. Backscatter data packets are received via a receiver from backscatter tags, with the backscatter data packets being associated with an offset frequency and are decoded by the receiver.

18 Claims, 18 Drawing Sheets

(56) References Cited

U.S. PATENT DOCUMENTS

| | | | |
|---|---|---|---|
| 2008/0107093 A1 | 5/2008 | Meiyappan et al. | |
| 2009/0028074 A1* | 1/2009 | Knox | H01Q 9/0435 |
| | | | 370/278 |
| 2009/0273408 A1 | 11/2009 | Inoue et al. | |
| 2009/0274072 A1* | 11/2009 | Knox | H01Q 1/2225 |
| | | | 343/702 |
| 2012/0146771 A1* | 6/2012 | Shimura | G06K 7/10297 |
| | | | 340/10.4 |
| 2012/0182906 A1* | 7/2012 | Knox | H04L 5/14 |
| | | | 370/278 |
| 2012/0188917 A1* | 7/2012 | Knox | H01Q 3/2623 |
| | | | 370/277 |
| 2012/0302282 A1 | 11/2012 | Pascolini | |
| 2014/0248837 A1* | 9/2014 | Zhou | H04B 1/0458 |
| | | | 333/2 |
| 2015/0109176 A1 | 4/2015 | Wan et al. | |
| 2015/0198708 A1* | 7/2015 | Khan | G01S 13/878 |
| | | | 342/146 |
| 2015/0236841 A1* | 8/2015 | Smida | H04L 27/00 |
| | | | 370/278 |
| 2017/0012675 A1* | 1/2017 | Frederick | H04L 25/4902 |
| 2017/0026022 A1* | 1/2017 | Craninckx | H04B 1/18 |
| 2017/0032158 A1* | 2/2017 | Wang | G06K 7/10356 |
| 2018/0041244 A1* | 2/2018 | Ding | H04B 1/48 |
| 2020/0266673 A1* | 8/2020 | Reynolds | H02J 50/001 |
| 2020/0334513 A1* | 10/2020 | Khojastepour | G06K 7/10099 |
| 2021/0059526 A1* | 3/2021 | Khaleghi | A61B 5/14539 |
| 2021/0359754 A1* | 11/2021 | Talla | G06K 7/0008 |

\* cited by examiner (a) Floor plan of the 4,000 $ft^2$ office space.

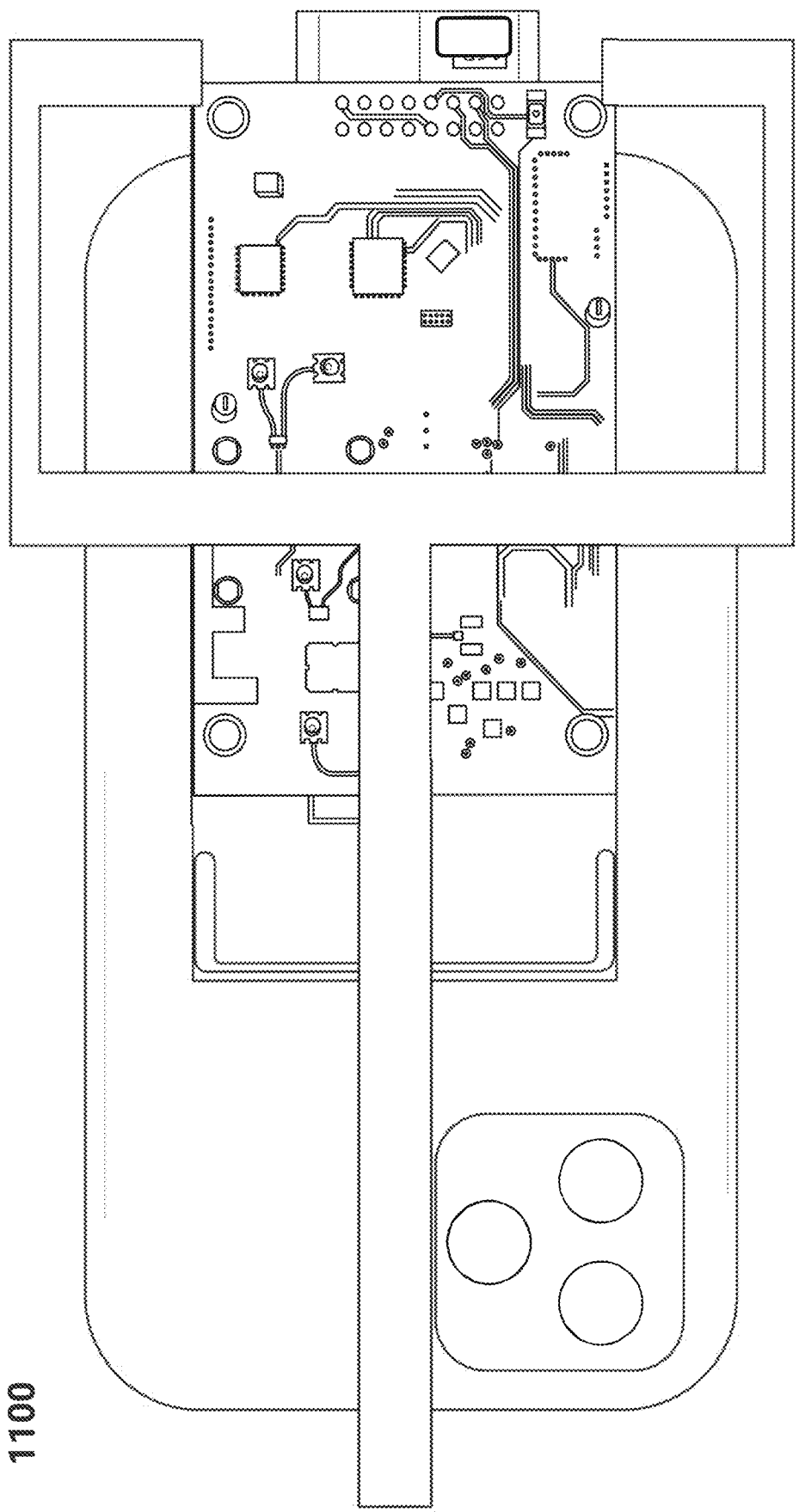

DUPLEX LONG RANGE BACKSCATTER WIRELESS COMMUNICATION SYSTEMS AND METHODS

CROSS-REFERENCE TO RELATED APPLICATIONS

This application claims priority to U.S. Prov. App No. 63/025,022 titled "DUPLEX LONG RANGE BACKSCATTER WIRELESS COMMUNICATION SYSTEMS AND METHODS" and filed on May 14, 2020, the disclosure of which is hereby incorporated herein by reference in its entirety.

BACKGROUND

Field

The disclosed technology relates generally to wireless communication technology and more particularly to duplex wireless communication systems and methods.

Description of the Related Art

Certain wireless communication systems may allow for use of discrete chips, such as tags, to be fixed to physical items. These discrete chips may be used to provide information associated with the physical items or may be used to inform locations of the physical items. For example, a tag may be fixed to an item being sold in a store. If the item is moved outside of the store without being deactivated or removed, a wireless communication system may detect the tag and sound an alarm. As another example, a tag may be fixed to an item being transported by a transportation company. A wireless communication system may be used to obtain (e.g., read) information from the tag, such as a description of the item, an owner of the item, and so on.

An example tag may include a radio-frequency identification (RFID) tag. An example RFID tag may form part of a physical card and be used to authorize entry into a public transportation system (e.g., a subway). In this example, the RFID tag may allow for contactless entry of a person holding the physical card and allow for charging the person for the entry. For example, an RFID reader may be built into a portion of a turnstile and the person may hold the physical card proximate to the portion.

While these tags are increasingly being used, at present they have substantial technical drawbacks. For example, an RFID tag may be limited to operating at short distances due to poor receive sensitivity (e.g., −90 dBm). In this way, an RFID tag may have limited usefulness for situations in which an RFID reader is required to be further from the RFID tag.

SUMMARY

Various examples of wireless systems, apparatuses, methods, and so on are described herein. For example, a backscatter system, backscatter reader, backscatter apparatus including a transmitter and receiver, and so on, may be described.

EXAMPLE 1

A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, and wherein the tunable impedance network is configured to reflect the single tone carrier to form a reflected signal;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, and wherein the microcontroller adjusts the portion of the passive elements to reduce, via the reflected signal, the signal power in the analog domain.

EXAMPLE 2

The system of example 1, wherein the transmitter comprises a frequency synthesizer and a power amplifier.

EXAMPLE 3

The system of example 1, wherein the microcontroller sets a value of the single tone carrier, and wherein the microcontroller causes tuning of the tunable impedance network prior to receipt of the backscatter data packets.

EXAMPLE 4

The system of example 1, wherein the receiver is configured to decode the backscatter data packets, wherein the backscatter data packets are provided according to the Long Range (LoRa) protocol, and wherein the microcontroller provides parameters associated with decoding the backscatter data packets to the receiver.

EXAMPLE 5

The system of example 4, wherein a particular parameter of the provided parameters identifies an offset frequency associated with the backscatter data packets.

EXAMPLE 6

The system of example 1, wherein subsequent to tuning the tunable impedance network, the microcontroller transitions to a downlink mode, and wherein the downlink mode causes receipt of the backscatter data packets.

EXAMPLE 7

The system of example 6, wherein the downlink mode causes the backscatter reader to transmit information to wake up the backscatter tags.

EXAMPLE 8

The system of example 1, wherein the portion of the passive elements are tunable capacitors.

EXAMPLE 9

The system of example 1, wherein the tunable capacitors are associated with a threshold amount of tunable bits.

EXAMPLE 10

The system of example 1, wherein the tunable impedance network is a two-stage network, wherein a first stage is associated with coarse tuning and a second stage is associated with fine-tuning, and wherein the second stage covers a step size associated with the first stage.

EXAMPLE 11

The system of example 1, wherein the tunable impedance network is a two-stage network, wherein the portion of passive elements comprises tunable capacitors, and wherein each stage comprises a subset of the tunable capacitors.

EXAMPLE 12

The system of example 11, wherein the two-stage network comprises a first stage and a second stage, and wherein the second stage is connected to the first stage via a resistive divider.

EXAMPLE 13

The system of example 11, wherein the passive elements further comprise inductors and resistors.

EXAMPLE 14

The system of example 1, wherein the tunable impedance network suppresses self-interface caused by the single tone carrier.

EXAMPLE 15

The system of example 1, wherein the first reflected signal is configured to cancel a different reflected signal which represents the single tone carrier as reflected by the antenna.

EXAMPLE 16

The system of example 15, wherein the reflected signal is further configured to cancel a leakage signal associated with the coupler.

EXAMPLE 17

The system of example 1, wherein based on an input of the single tone carrier via the transmitter, the coupler is configured to split the single tone carrier between the antenna and the tunable impedance network.

EXAMPLE 18

The system of example 1, wherein based on an input of a particular signal from the antenna, the coupler is configured to split the particular signal between the transmitter and the receiver.

EXAMPLE 19

The system of example 18, wherein based on the input of a particular signal from the antenna, the coupler is configured to isolate the tunable impedance network from the particular signal.

EXAMPLE 20

The system of example 18, wherein the particular signal represents a reflection of the single tone carrier from the antenna, and wherein the split particular signal is received by the receiver.

EXAMPLE 21

The system of example 20, wherein the microcontroller is configured to adjust the portion of passive elements to cancel the split particular signal received by the receiver.

EXAMPLE 22

The system of example 1, wherein the microcontroller uses simulated annealing to adjust the portion of passive elements.

Example: A backscatter reader comprising:
- an antenna, the antenna being operable to simultaneously transmit and receive;
- a transmitter configured to output a single tone carrier for transmission via the antenna;
- a receiver configured to receive, via the antenna, backscatter data packets from one or more backscatter tags positioned in a real-world environment;
- a tunable impedance network comprising a plurality of passive elements, wherein a portion of the passive elements are tunable, and wherein the tunable impedance network is configured to reflect the single tone carrier to form a reflected signal;
- a coupler, wherein the coupler is connected to the antenna, transmitter, receiver, and tunable impedance network, and wherein based on an input of the single tone carrier via the transmitter the coupler is configured to isolate the receiver from the single tone carrier; and
- a microcontroller, wherein the microcontroller obtains one or more measurements associated with signal power of the single tone carrier at an input of the receiver, and wherein the microcontroller adjusts the portion of the passive elements to reduce, via the reflected signal, the signal power in the analog domain.

EXAMPLE 23

An apparatus, wherein the apparatus implements a full-duplex backscatter reader, and wherein the apparatus comprises:
- a coupler, the coupler being connected to an antenna, a transmitter, a receiver, and a tunable impedance network, wherein the antenna is operable to simultaneously receive and transmit, wherein the transmitter outputs a carrier signal which is split by the coupler between the antenna and tunable impedance network, and wherein the coupler is configured to isolate the receiver from the carrier signal;
- the tunable impedance network, wherein the tunable impedance network comprises a plurality of passive elements, and wherein the passive elements are adjustable; and a microcontroller, the microcontroller tuning the passive elements to adjust a reflected signal which represents the carrier signal as reflected by the tunable impedance network, wherein the adjusted reflected signal causes, in the analog domain, at least a threshold reduction in signal power of the carrier signal as received at the receiver.

EXAMPLE 24

The apparatus of example 23, wherein the threshold reduction is 78 dB.

EXAMPLE 25

The apparatus of example 23, wherein the tunable impedance network causes at least the threshold reduction in signal power in the analog domain.

EXAMPLE 26

The apparatus of example 23, wherein the transmitter comprises a frequency synthesizer and a power amplifier.

EXAMPLE 27

The apparatus of example 23, wherein the antenna receives signals representing one or more backscatter data packets, and wherein the receiver is configured to decode the backscatter data packets.

EXAMPLE 28

The apparatus of example 27, wherein the microcontroller sets a value of the carrier signal, and wherein the microcontroller causes tuning of the tunable impedance network prior to receipt of the backscatter data packets.

EXAMPLE 29

The apparatus of example 27, wherein the microcontroller provides parameters to the receiver to enable the decoding.

EXAMPLE 30

The apparatus of example 29, wherein a particular parameter of the provided parameters identifies an offset frequency associated with the backscatter data packets.

EXAMPLE 31

The apparatus of example 27, wherein the backscatter data packets are provided according to the Long Range (LoRa) protocol.

EXAMPLE 32

The apparatus of example 27, wherein subsequent to tuning the tunable impedance network, the microcontroller transitions to a downlink mode, and wherein the downlink mode causes receipt of the backscatter data packets.

EXAMPLE 33

The apparatus of example 32, wherein the downlink mode causes the apparatus to transmit information to wake up one or more backscatter tags proximate to the apparatus, and wherein the microcontroller transitions to an uplink mode in which the receiver is configured to decode the backscatter data packets.

EXAMPLE 34

The apparatus of example 23, wherein the passive elements comprise capacitors, and wherein respective capacitances of the capacitors are adjustable.

EXAMPLE 35

The apparatus of example 23, wherein the tunable impedance network is a two-stage network, wherein a first stage is associated with coarse tuning and a second stage is associated with fine-tuning, and wherein the second stage covers a step size associated with the first stage.

EXAMPLE 36

The apparatus of example 35, wherein the two-stage network comprises a first stage and a second stage, and wherein the second stage is connected to the first stage via a resistive divider.

EXAMPLE 37

The apparatus of example 23, wherein the tunable impedance network suppresses self-interface caused by the carrier signal.

EXAMPLE 38

The apparatus of example 23, wherein the adjusted reflected signal is configured to cancel a different reflected signal which represents the carrier signal as reflected by the antenna.

EXAMPLE 39

The apparatus of example 23, wherein the adjusted reflected signal is further configured to cancel a leakage signal associated with the coupler.

EXAMPLE 40

The apparatus of example 23, wherein the microcontroller uses simulated annealing to adjust the portion of passive elements.

Example: A backscatter reader comprising:
  a coupler, the coupler being connected to an antenna, a transmitter, a receiver, and a tunable impedance network, wherein the antenna is operable to simultaneously receive and transmit, wherein the transmitter outputs a carrier signal which is split by the coupler between the antenna and tunable impedance network, and wherein the coupler is configured to isolate the receiver from the carrier signal;
  the tunable impedance network, wherein the tunable impedance network comprises a plurality of passive elements, and wherein the passive elements are adjustable; and
  a microcontroller, the microcontroller tuning the passive elements to adjust a reflected signal which represents the carrier signal as reflected by the tunable impedance network, wherein the adjusted reflected signal causes, in the analog domain, at least a threshold reduction in signal power of the carrier signal as received at the receiver.

EXAMPLE 41

A backscatter reader, the backscatter reader being full-duplex, and the backscatter reader comprising:
a microcontroller configured to set values of tunable capacitors included in a tunable impedance network of the backscatter reader,
wherein the backscatter reader transmits a single tone carrier which causes self-interference, wherein the microcontroller determines values of the tunable capacitors which reduce a power level associated with the self-interference by a threshold amount in the analog domain, and wherein the threshold amount reduction enables decoding of signals associated with an offset frequency which represent backscatter data packets from backscatter tags.

EXAMPLE 42

The backscatter reader of example 41, wherein the microcontroller determines the values based on simulated annealing.

EXAMPLE 43

The backscatter reader of example 41, wherein the microcontroller sets the determined values prior to receipt of the backscatter data packets.

EXAMPLE 44

The backscatter reader of example 41, wherein the tunable impedance network is a two-stage network comprising a first stage and a second stage, and wherein the second stage is separated from the first stage via a resistive divider.

EXAMPLE 45

The backscatter reader of example 41, wherein the tunable impedance network reflects the single tone carrier such that the reflection is configured to reduce a power level of the single tone carrier as received at a receiver of the backscatter reader by the threshold amount.

EXAMPLE 46

The backscatter reader of example 41, wherein the threshold amount is 78 dB.

EXAMPLE 47

The backscatter reader of example 41, wherein the threshold amount, in combination with a carrier blocker tolerance of a receiver of the backscatter system, is greater than or equal to a receive sensitivity of the receiver, such that the receiver can decode the backscatter data packets.

EXAMPLE 48

A method implemented by a full-duplex backscatter system, the method comprising:
outputting, via a transmitter of the backscatter system, a single tone carrier for transmission via an antenna of the backscatter system;
tuning, via a microcontroller, a tunable impedance network to reduce self-interference associated with the signal tone carrier by at least a threshold level, wherein the tunable impedance network comprises a plurality of passive elements which are configured to be tuned, and wherein the self-interference reduction by the threshold level is in the analog domain;
receiving, via a receiver of the backscatter system and from one or more backscatter tags, backscatter data packets, wherein the backscatter data packets are associated with an offset frequency and are decoded by the receiver.

EXAMPLE 49

The method of example 48, further comprising:
adjusting, via the microcontroller, the single tone carrier such that frequency hopping is enabled.

EXAMPLE 50

The method of example 48, wherein the tunable impedance network reduces a signal strength associated with the single tone carrier at the receiver.

EXAMPLE 51

The method of example 48, wherein the threshold level is 78 dB.

EXAMPLE 52

The method of example 48, wherein the passive elements comprise tunable capacitors.

EXAMPLE 53

The method of example 52, wherein the microcontroller determines capacitance values for the tunable capacitors.

EXAMPLE 54

The method of example 48, wherein the microcontroller determines tunes the tunable impedance network based on simulated annealing.

EXAMPLE 55

The method of example 48, wherein the tunable impedance network is a two-stage network, wherein a first stage is associated with coarse tuning and a second stage is associated with fine-tuning, and wherein the second stage covers a step size associated with the first stage.

EXAMPLE 56

The method of example 55, wherein the two-stage network comprises a first stage and a second stage, and wherein the second stage is connected to the first stage via a resistive divider.

EXAMPLE 57

The method of example 48, further comprising:
splitting, via a coupler of the backscatter system, the single tone carrier between an antenna and the tunable impedance network, wherein the coupler is configured to isolate the receiver from the single tone carrier.

EXAMPLE 58

The method of example 57 further comprising:
splitting, via the coupler, a reflection of the single tone carrier from the antenna between the receiver and the transmitter, wherein the coupler is configured to isolate the tunable impedance network from the reflection.

EXAMPLE 59

The method of example 58, wherein the tunable impedance network is tuned to reduce the split reflection by the threshold level at the receiver.

EXAMPLE 60

The method of example 48, further comprising:
providing, to the receiver and via the microcontroller, one or more parameters associated with the decoding the backscatter data packets, wherein the parameters are associated with the Long Range (LoRa) protocol, and wherein a particular parameter of the parameters identifies the offset frequency.

BRIEF DESCRIPTION OF THE DRAWINGS

FIGS. 11A-11C illustrate performance associated with a mobile device.

DETAILED DESCRIPTION

Figure 1A:
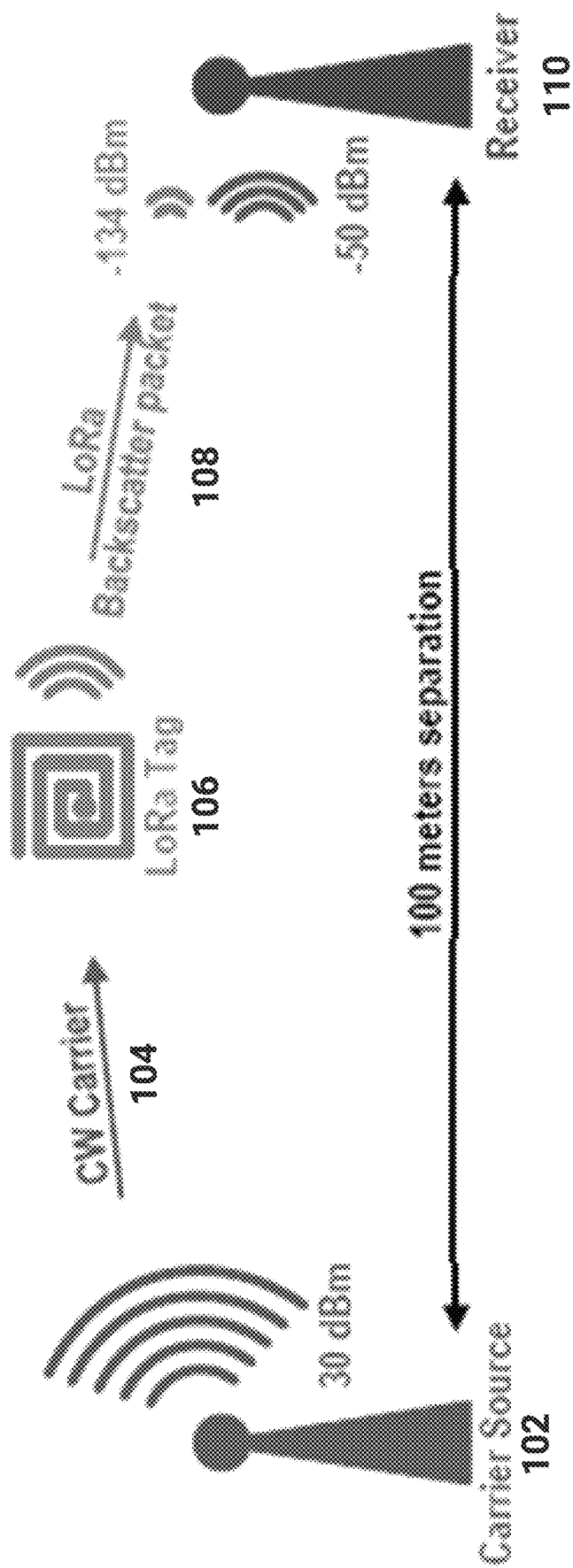
FIG. 1A illustrates a traditional HD backscatter system which, in this example, uses the Long Range (LoRa) protocol.

This application describes an enhanced backscatter system, such as a backscatter reader, which is usable to communicate with one or more backscatter tags. In contrast to other example backscatter systems, such as illustrated in FIG. 1A, the backscatter system described herein enables full-duplex communications. Thus, the backscatter system may include a transmitter and a receiver. While the description herein focuses on the backscatter system including a transmitter and receiver, in some embodiments the transmitter and/or receiver may be physically separated and in wired communication. Furthermore, the backscatter system described herein enables long range communications between the system and a backscatter tag. For example, the backscatter system and backscatter tag may be in wireless communication when separated by greater than a threshold distance (e.g., 300 feet, 400 feet, 800 feet, and so on). Advantageously, the backscatter system may allow for communications using disparate communication techniques, such as Long Range (LoRa), Zigbee, WiFi, Bluetooth, 802.15.4g, and so on. In this way, a discrete backscatter system may obtain information via differing communication techniques from backscatter tags which are physically far from each other in a real-world environment.

Backscatter, as described in more detail below, is an example of a wireless technology which advantageously avoids use of radio frequency (RF) carrier generation at a tag (e.g., a backscatter tag). Instead, the backscatter tag may reflect existing ambient RF signals which are modified for data transmission. For example, a transmitter may generate a single tone carrier. In this example, the backscatter tag may reflect the single tone carrier to synthesize data packets. In some embodiments, the backscatter tag may use example modulation techniques such as chirp spread spectrum to synthesize the data packets. The backscatter tag may synthesize the data packets at an offset frequency from the single tone carrier. As a non-limiting example, a frequency offset (e.g., in a chirp spread spectrum signal) may be created in a band centered at the single tone carrier and offset frequency which is different from that of the single tone carrier. A receiver may then receive the synthesized data packets. Additional description regarding backscatter, and backscatter tags, is included in U.S. Pat. No. 10,812,130, which is hereby incorporated herein by reference in its entirety.

Through enabling such far-reaching full-duplex communications between a backscatter system (e.g., a single backscatter reader) and a backscatter tag, applications of such wireless technology may be newly introduced. As an example, a drone may be affixed with a backscatter system and be operated to obtain sensor information from a multitude of backscatter tags positioned in a real-world area. As another example, a backscatter system may be operated to obtain information from a backscatter tag fixed to, or formed in, a contact lens. Additionally, the backscatter system may be utilized to communicate with peripheral devices, wearable devices (e.g., smart glasses), medical devices (e.g., pill bottles, insulin pens), and so on.

As will be described, the backscatter system described herein may include a microcontroller configured to adjust a tunable impedance network. In some embodiments, the tunable impedance network may achieve 78 dB of cancellation (e.g., self-interference cancellation, such as cancellation of the single tone carrier at the receiver). In some embodiments, the network may achieve 70 dB, 80 dB, 90 dB, and so on, of cancellation. Since the backscatter system may include a co-located transmitter and receiver, the cancellation may be used to reduce a carrier signal (e.g., the above-described single tone carrier) which is output by the transmitter as received at the receiver. Thus, the single tone carrier can be reduced in power at the receiver and the data packets which are associated with an offset frequency can be decoded.

As is known by those skilled in the art, achieving such a reduction in signal strength may typically require use of digital cancellation techniques. For example, digital cancellation techniques may require use of IQ samples which may be unavailable on commodity radios. Thus, software-defined radios (SDRs), field-programmable gate arrays (FPGAs), digital signal processors (DSPs) may be used. As may be appreciated, these techniques may introduce substantial complexity and cost. Furthermore, example analog techniques may require use of bulky and costly components such as circulators, vector modulators, and phase shifters.

Advantageously, the above-described tunable impedance network may include passive components of which at least a portion are adjustable by the microcontroller. In this way, the cancellation techniques described herein may be performed in the analog domain (e.g., entirely in the analog domain and not the digital domain). For example, the tunable impedance network may include a multitude of tunable capacitors. In this example, the microcontroller may set values of the tunable capacitors in real-time during operation of the backscatter system (e.g., substantially real-time). For example, the microcontroller may tune the tunable impedance network during an initial mode in which the transmitter outputs the single tone carrier. Subsequently, the microcontroller may cause information (e.g., one or more messages) to be transmitted which causes the backscatter tags to provide backscatter data packets to the backscatter system for decoding.

As will be described, the microcontroller may adjust the tunable capacitors to, at least, substantially cancel (e.g., reduce) a signal associated with the antenna. The signal may represent, as an example, the above-described single tone carrier as reflected by the antenna. As an example, the microcontroller may adjust the tunable impedance network to track antenna impedance to reflect and/or phase shift a portion of the single tone carrier. In this way, the microcontroller may suppress self-interference which flows to the receiver.

This specification describes cancelling, and cancellation of, signals, such as a single tone carrier. It may be appreciated that such terminology, in some examples, may refer to reducing a power level, or other power metric, by a threshold. For example, cancelling may refer to reducing a power level by 70 dB, 78 dB, 80 dB, 90 dB, and so on. Additionally, the specification describes a microcontroller. It may be appreciated that a multitude of microcontrollers may be used. Additionally, the microcontroller may be a field-programmable gate array (FPGA), graphics processing unit (GPU), central processing unit (CPU), processor, application specific integrated circuit (ASIC), and so on.

Background—Backscatter

Other backscatter systems, such as half duplex (HD) backscatter systems, may leverage the economies of scale and ubiquity of industry standard protocols such as WiFi, Bluetooth, ZigBee, and Long Range (LoRa), and need two physically separated radio devices. A first radio device may transmit a carrier and a second radio device may receive a backscattered data packet. This need to deploy multiple radio devices in different locations may thus limit the use cases for backscatter.

In conventional deployments, a single radio is sufficient to communicate with sensor endpoints (e.g., sensors associated with backscatter tags). As described above, HD backscatter may use transmit and receive radio devices which are physically separated to mitigate self-interference. These radio devices, however, must also work in close coordination, which complicates deployment and adds network overhead. Additionally, the performance of an HD backscatter system may be based on relative distances between the transmitter, receiver, and backscatter tag. Thus, complex link budget analysis may be required which hinders mass adoption.

For example, a transmitter and receiver may be separated by 100 meters. In this example, LoRa may be used. For a data rate of 2 kbps, the backscatter tag can be placed anywhere in between. However, if the separation is increased then dead zones may arise (e.g., around the center). As another example, if the backscatter tag is co-located with the transmitter, then the receiver may be placed substantially further. As may be appreciated, such analysis is technically complicated. In certain applications, such as agriculture, it may be impractical to set up two physically separated devices (e.g., a transmitter, a receiver) where each needs its own power source.

However, if a single backscatter system could communicate with backscatter tags, that would address one of the remaining pain points. For example, and as described above, backscatter tags could be included in, or affixed to, disparate devices or physical items. Example devices or physical items may include pill bottles, insulin pens, smart glasses, contact lenses, sensors, public transportation cards, and so on. Additionally, the backscatter system (e.g., a reader) could be integrated into a portable device such as a cellphone or tablet.

FIG. 1A illustrates an example half-duplex (HD) backscatter system which, in this example, uses LoRa. The carrier source 102 (e.g., a first radio) transmits a single-tone carrier 104, for example, at power levels up to 30 dBm. A backscatter tag 106 backscatters this signal 104 with subcarrier modulation to synthesize a data packet 108 at an offset frequency. The packet 108 is received by a receiver 110 (e.g., a second radio) which is 100 m from the carrier source 102. The physical separation may be necessary to attenuate the out-of-band interference at the receiver 110 to a level where it does not impact the sensitivity.

FIG. 1A illustrates an example challenge with respect to a backscatter system which is full duplex. In the illustrated example, with the separation the packet 108 may be received at a first power level (e.g., −134 dBm) while the single-tone carrier 104 is received at a second, greater, power level (e.g., −50 dBm). Thus, the single-tone carrier 104 may need substantial attenuation (e.g., cancellation) between the carrier source 102 and receiver 110 if they are co-located (e.g., integrated on a same printed circuit board). In some embodiments, the attenuation may be 78 dB which represents a 63-million times reduction in signal strength. Unlike pathloss attenuation, which is wideband, typical cancellation techniques may have a trade-off between cancellation depth and bandwidth. If the cancellation bandwidth is insufficient, the carrier phase noise may be evident as in-band noise at the receiver 110. Thus, the phase noise of the carrier at the offset frequency may need to be below the input noise level of the receiver 110.

Introduction—Full-Duplex Backscatter System

Described herein is a full-duplex (FD) backscatter system which addresses the above-described technical challenges. Advantageously, in some embodiments existing (e.g., common off the shelf) parts may be leveraged to form the backscatter system. For example, and with respect to the example of Long Range (LoRa), existing LoRa transceivers and microcontrollers may be used in combination with inexpensive passive components to build a low-cost, low-complexity, small-form-factor full-duplex LoRa backscatter system (e.g., backscatter reader).

Figure 1B:
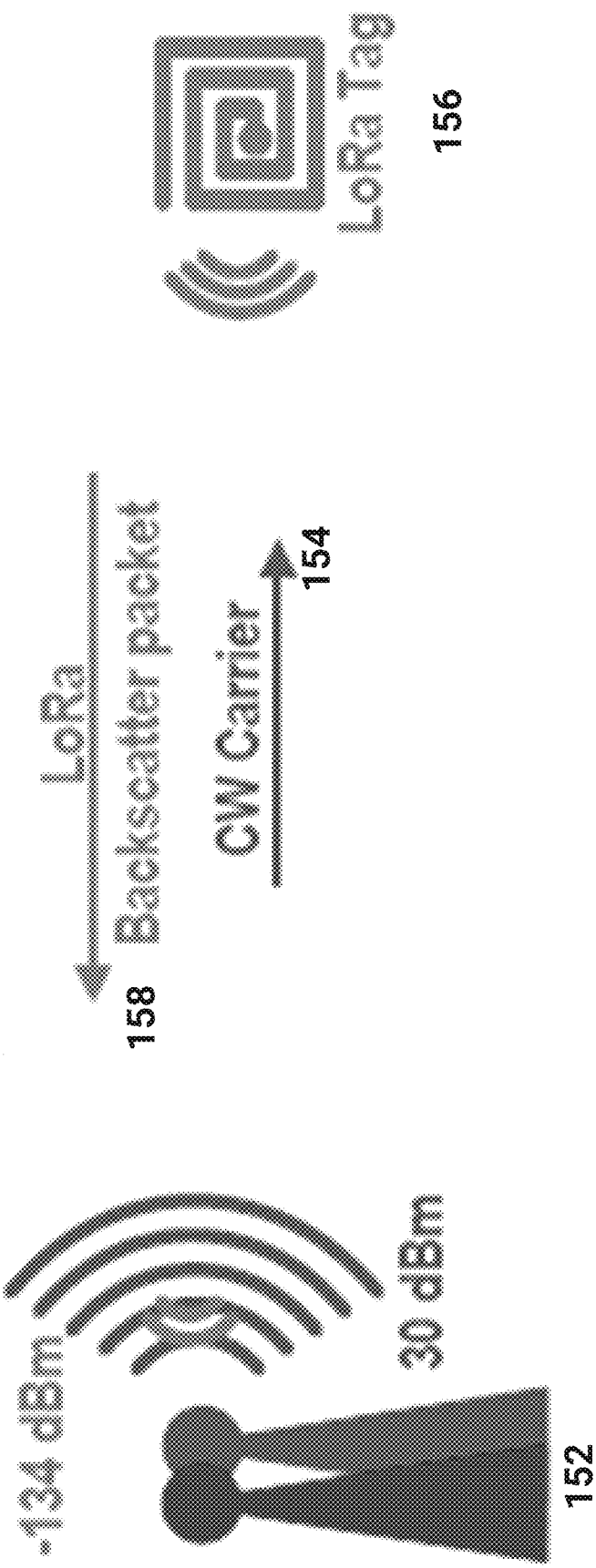
FIG. 1B illustrates an example of a full-duplex backscatter system where the carrier source and receiver are integrated in a same backscatter system.

FIG. 1B illustrates an example of a full-duplex backscatter system (e.g., backscatter reader) where the carrier source and receiver are integrated in a same backscatter system 152. As illustrated, a single-tone carrier 154 may be output by the backscatter system 152 and reflected by a backscatter tag 156. A backscatter packet 158 may then be provided to the backscatter system 152. The single-tone carrier 154 is illustrated as being provided at a first power level (e.g., 30 dBm) while the backscatter packet 158 is received at a second power level (e.g., −134 dBm).

Advantageously, the backscatter system 152 described herein may use a combination of, as an example, a microcontroller (e.g., a processor, application specific integrated circuit, and so on) and passive elements to achieve substantial cancellation of the above-described single-tone carrier 154 in the analog domain (e.g., as received at the receiver of the system 152). For example, 78 dB cancellation may be achieved using one or more couplers and a tunable impedance network.

Figure 4A:
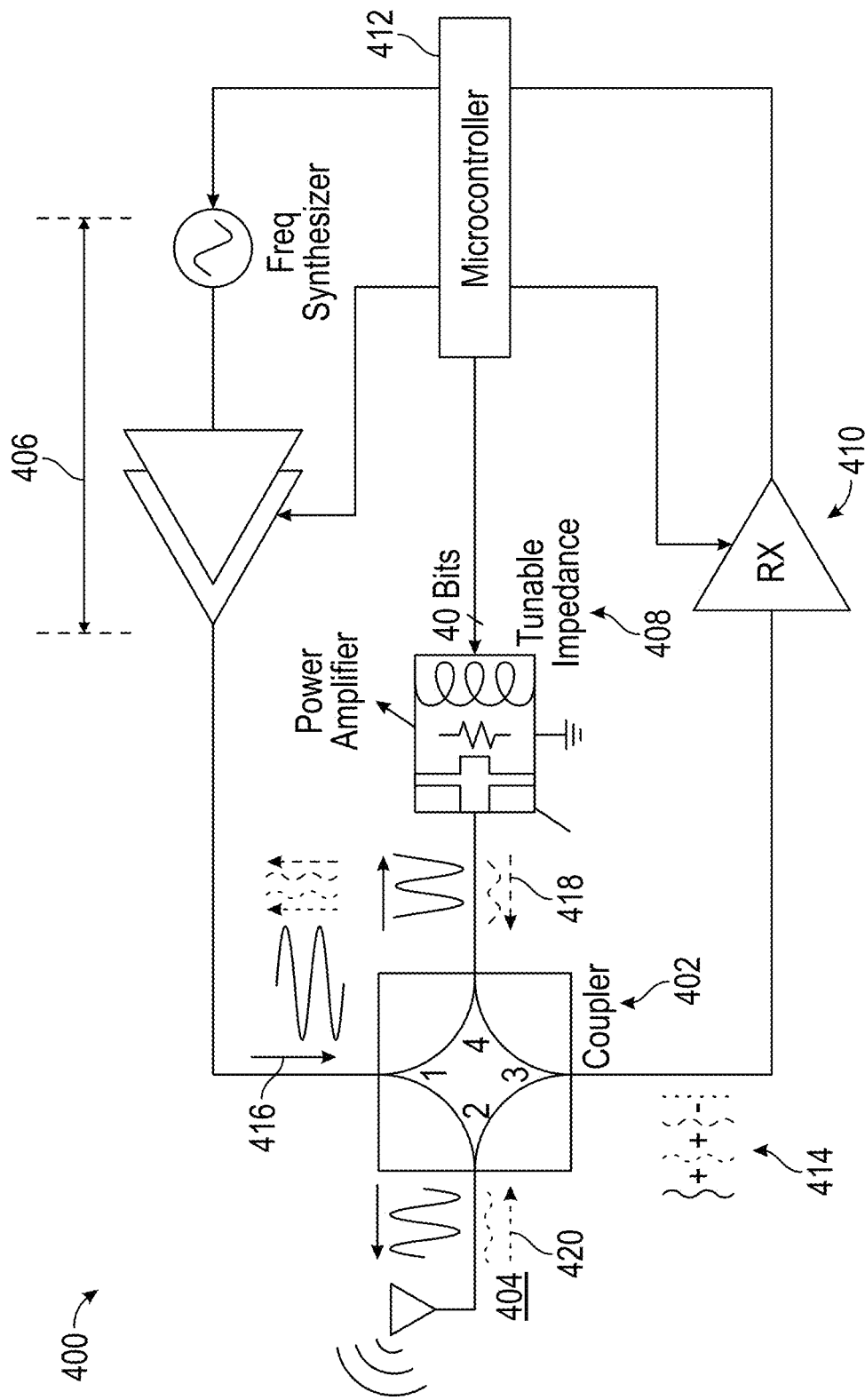
FIG. 4A is a block diagram of an example full-duplex backscatter system.
Figure 4B:
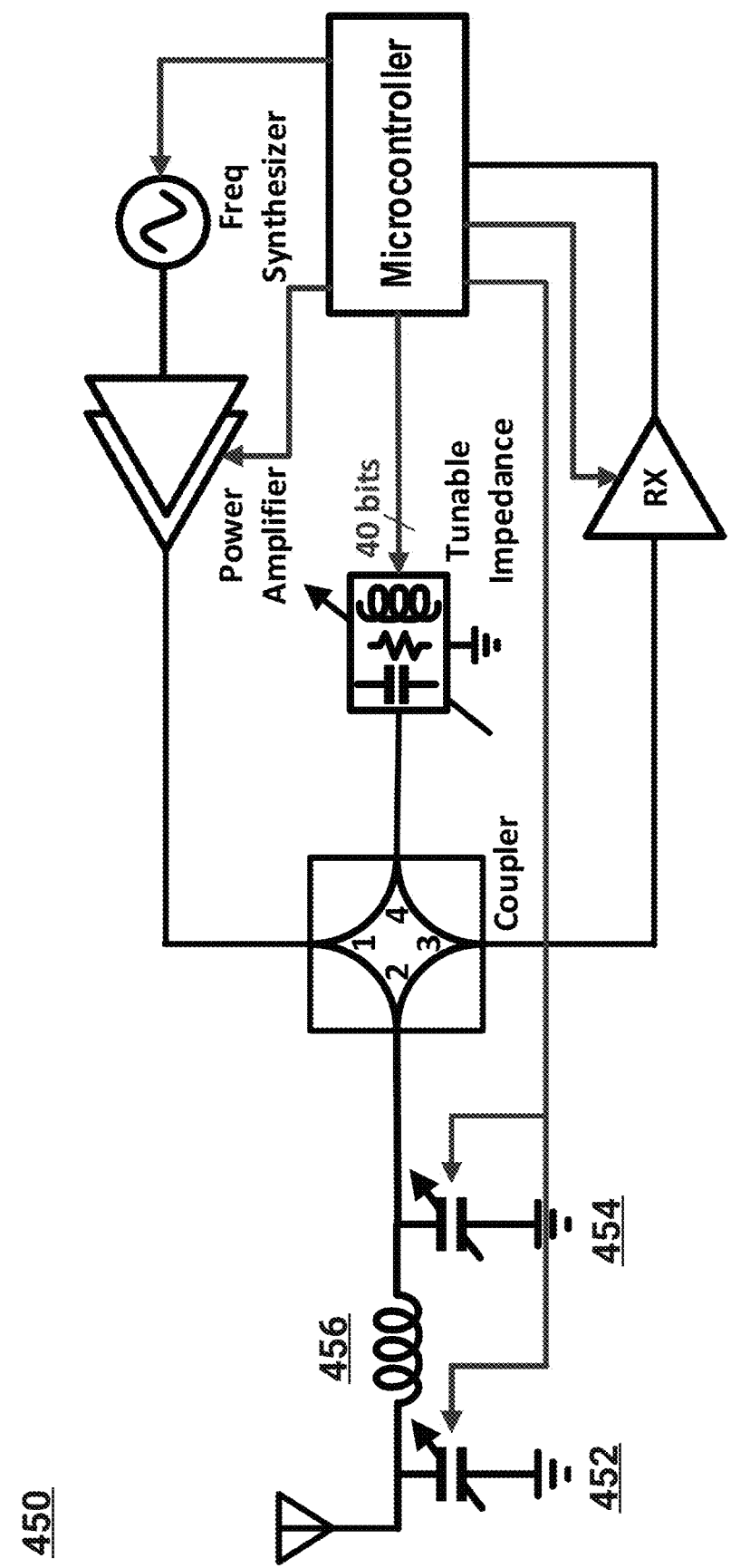
FIG. 4B illustrates another example backscatter system which includes additional tunable capacitors.

In some embodiments, and as illustrated in FIGS. 4A-4B, a single-antenna topology may be used with a hybrid coupler to interface the transmitter and the receiver with the antenna. In some embodiments, a different antenna topology may be used. The coupled port may be connected to a tunable impedance network. Leakage from the transmitter to the receiver (e.g., self-interference) may be based on a function of the impedance at the coupled port. A microcontroller may be used to adaptively tune the impedance network via tracking variations in the antenna impedance and environmental reflections with the objective of reducing (e.g., substantially minimizing) interference at the receiver.

As is known by those skilled in the art, cancellation may be a function of how closely the impedance network is able to track the above-described variations. The cancellation may thus depend on the resolution of the impedance network. A single-stage network may be limited by the step size of its constituent tunable elements, the digital capacitors, which may not have high enough resolution to reliably achieve 78 dB self-interference (herein also referred to as 'SI') cancellation. To achieve higher resolution, the backscatter system described herein may use a multi-stage, tunable impedance network. For example, there may be two stages which are implemented by cascading two networks with an attenuating resistor network between the stages.

Each of the above-described stages may include a first threshold number (e.g., four, five, nine) of tunable capacitors and a second threshold number (e.g., two, three, five) of fixed inductors. An example first stage may provide enough resolution to reliably achieve a particular cancellation (e.g., 45 dB, 50 dB, 55 dB, cancellation). The resistor network may have the effect of shrinking the perceived impedance variation of the subsequent stage (e.g., an example second stage). The values may be selected such that the impedance variation of the example second stage, as seen at the coupled port, covers the step size of the first stage. Thus, fine-grain control of the impedance may be provided without dead zones.

Using the above-described two-stage network, and with respect to some embodiments, at least 78 dB of cancellation may be effectuated across the expected range of variation in antenna impedance. To achieve bringing the phase noise of the carrier at the offset frequency to below the noise floor of the receiver, while simultaneously obtaining the example 78 dB cancellation at the carrier frequency, may present technological challenges. For example, there is a fundamental trade-off between the cancellation depth and bandwidth. In some embodiments, the backscatter system described herein may prioritize the 78 dB cancellation requirement at the carrier frequency. In some embodiments, a synthesizer with low phase noise may be used to relax the cancellation requirement at the offset frequency.

In some embodiments, the backscatter system 152 can communicate with a backscatter tag 156 at distances of, at least, 300 feet (e.g., in direct line of sight). When placed in the corner of a 4,000 ft$^2$ office space with multiple concrete, glass, and wood structures and walls, tags can operate within the entire space. Additionally, the system 152 can be integrated into, or affixed to, portable devices (e.g., smart phones, tablets, wearable devices such as smartwatches, and so on). In some embodiments, the system 152 can communicate at distances beyond 50 ft at 20 dBm, 25 ft at 10 dBm, and up to 20 ft at 4 dBm.

Figure 12A:
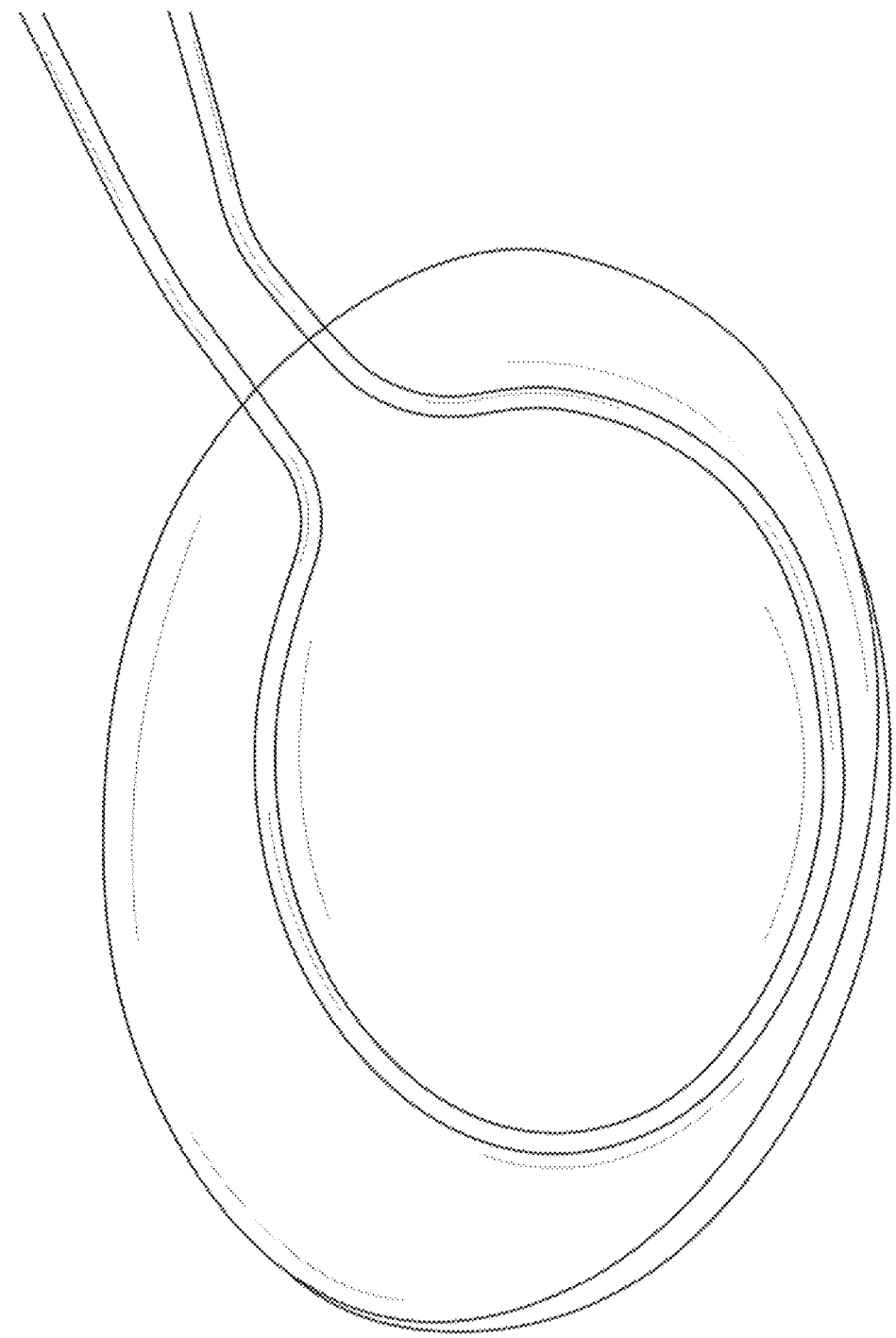
FIGS. 12A-12C illustrate performance associated with a contact lens integrated with a backscatter tag.
Figure 13A:
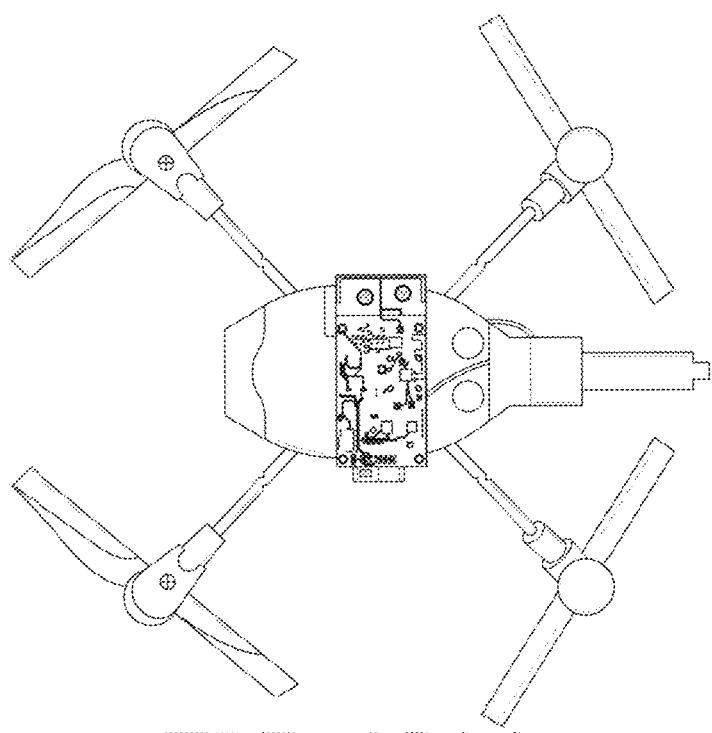
FIGS. 13A-13B illustrate performance associated with a drone affixed with a backscatter system.

Via the techniques described herein the backscatter system 152 may be used with disparate applications. For example, the backscatter tag 156 may be integrated into, or affixed to, a contact lens (e.g., illustrated in FIG. 12A). The tag 156 may communicate with the system 152 (e.g., as attached to a smartphone) at distances of at least 22 ft and also when the system 152 is inside a user's pocket. The system 152 can be affixed to a quadcopter (e.g., a drone, as illustrated in FIG. 13A) and flown over a field at a height of 60 ft. The system 152 may be able to communicate with backscatter tags placed on the ground at a lateral distance of at least 50 ft, corresponding to an instantaneous coverage of at least 7,850 ft$^2$.

Introduction—Tunable Impedance Network

The backscatter system described herein combines a carrier source (e.g., transmitter) and a receiver into a discrete device (e.g., a discrete backscatter reader). In contrast to the backscatter system of FIG. 1A, the system described herein does not rely upon physical separation to attenuate the carrier signal before it reaches the receiver. Thus, a cancellation network (herein referred to as a 'tunable impedance network') may be used to suppress the carrier (e.g., single tone carrier) and reduce self-interference (SI) at the receiver.

Without being constrained by theory, an example description of cancellation requirements for a backscatter system are described. The below description makes reference to LoRa, however backscatter system is, as an example, not LoRa specific and may be extended to other wireless communication techniques. For example, the backscatter system may be utilized with other wireless standards such as WiFi, Zigbee, Bluetooth, Sig-Fox, NB-IoT, DASH7, 802.11ah, 802.15.4g, and so on.

The cancellation requirements may, as an example, be classified into two categories, carrier cancellation and offset cancellation.

With respect to carrier cancellation, a blocker may represent a strong signal in the vicinity of a desired signal which can affect a receiver's performance and reduce its sensitivity. A strong blocker can saturate a low noise amplifier (LNA), thus causing it to reduce gain and increase the noise floor. Secondly, post LNA, a blocker can mix with the receiver local-oscillator phase-noise and contribute to in-band noise. Finally, baseband filters may have limited stopband attenuation and even a small portion of the blocker passing through the filter reduces the signal-to-noise and -interference ratio.

Commodity receiver datasheets may specify blocker tolerance as the strongest interference at a frequency offset that the receiver can handle with a 3 dB loss in sensitivity. Since, 3 dB degradation may, as an example, be considered substantial for backscatter systems, tests may be performed for less than 1 dB loss in sensitivity. Carrier cancellation ($CAN_{CR}$) may be defined as the required SI cancellation at the center frequency. Using the blocker tolerance specification, a minimum required carrier cancellation may be determined for a given output power $P_{CR}$ as $$CAN_{CR} > P_{CR} - Rx_{Sen} - Rx_{BT} \quad (1)$$

where $Rx_{Sen}$ is the receiver sensitivity and $Rx_{BT}$ is the receiver blocker tolerance. As may be appreciated by those skilled in the art, in some examples 78 dB may represent an example stringent carrier-cancellation specification.

Figure 2:
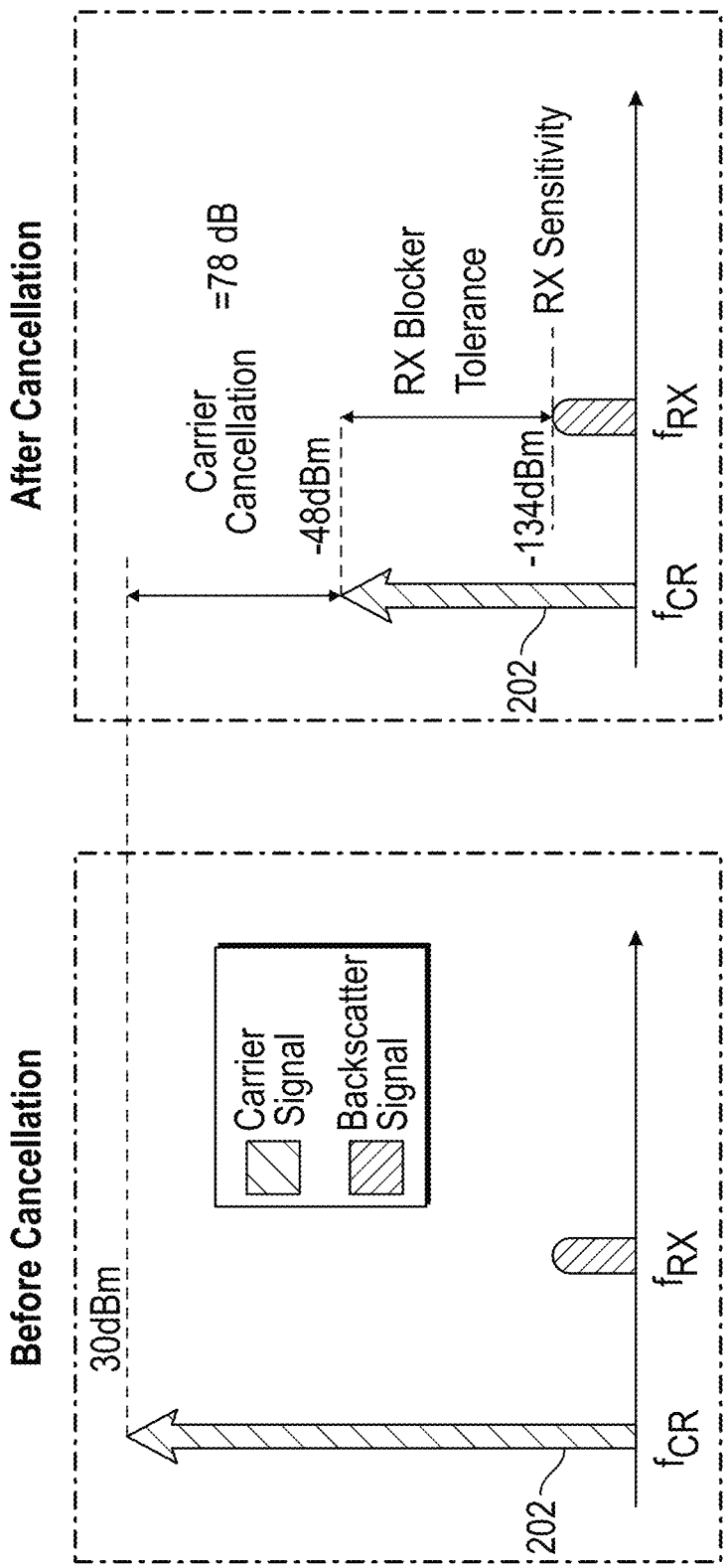
FIG. 2 illustrates an example of the above-described carrier cancellation requirement.

FIG. 2 illustrates an example of the above-described carrier cancellation requirement. Before cancellation, a carrier signal 202 is at a first power level (e.g., 30 dBm) before cancellation. Subsequent to cancellation, the carrier signal 202 is reduced to a second power level (e.g., −48 dBm) which the backscatter system's receiver can tolerate. The difference between these levels is the above-described $CAN_{CR}$. In some embodiments, a lower cancellation may suffice for some data rates and frequency offsets.

Figure 3:
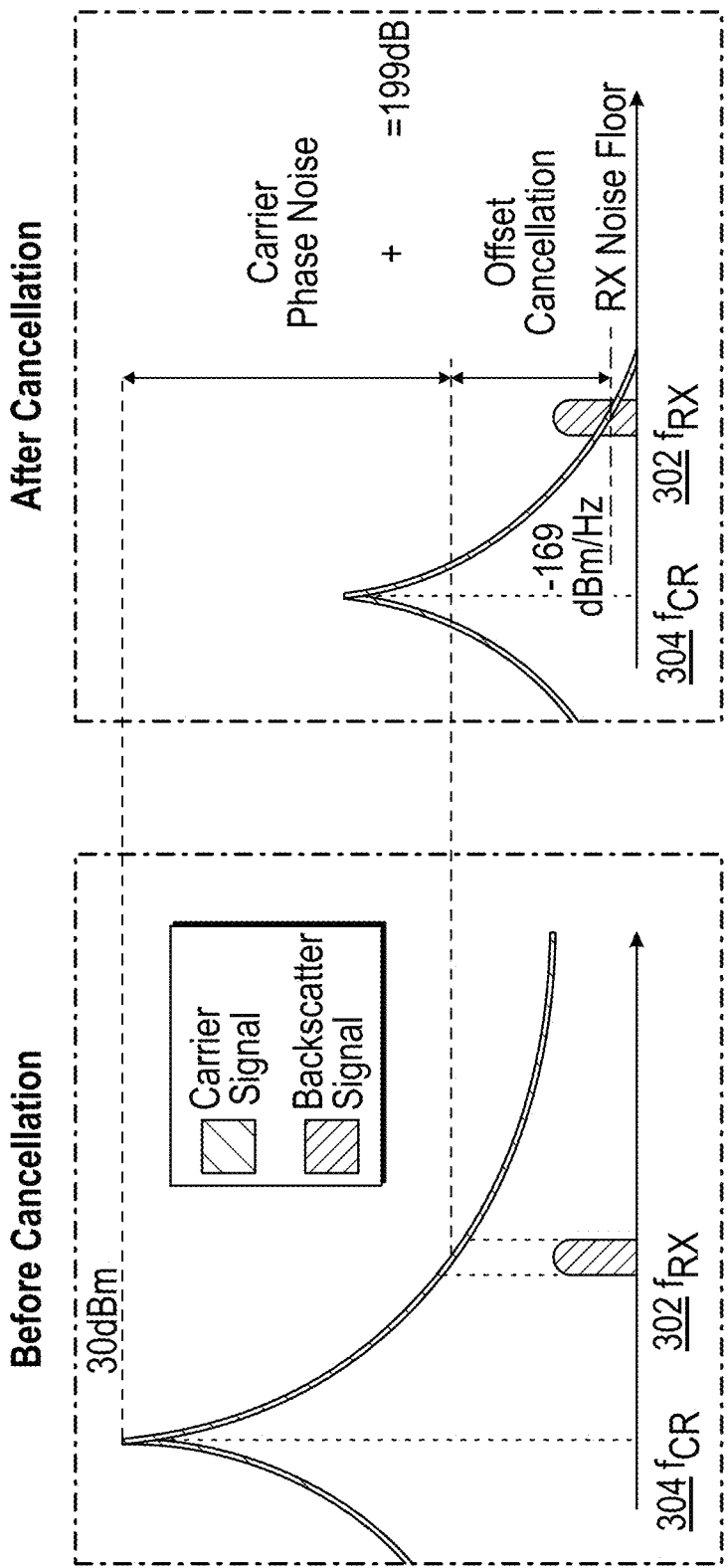
FIG. 3 illustrates an example associated with offset cancellation.

FIG. 3 illustrates an example associated with offset cancellation. In some embodiments, the backscatter system's transmitter may use a single tone signal as the carrier. As may be appreciated, practical oscillators may have phase-modulated noise components which spreads the power to adjacent frequencies. This may result in noise side bands and is characterized by its phase noise (e.g., power spectral density, such as dBm/Hz) of the noise at a frequency offset from the center frequency. Since the receiver operates at a frequency offset from the carrier, the phase noise of the carrier shows up as in-band noise and can degrade the receiver sensitivity by raising the noise floor.

Offset cancellation $CAN_{OF\_S}$ may represent the cancellation at the offset frequency. In some embodiments, the noise of the self-interference after cancellation at the offset frequency should be less than the receiver noise floor as described below:

$$P_{CR} + L_{CR(\Delta f)} + 10 \text{Log}(b) - CAN_{OF\_S} < 10 \text{Log}(KTB) + Rx_{NF} \quad (2)$$

$$CAN_{OF\_S} - L_{CR(\Delta f)} > P_{CR} - 10 \text{Log}(KT) - Rx_{NF}$$

where $L_{CR(\Delta f)}$ is the phase noise of the carrier at offset frequency $\Delta f$, B is the receiver bandwidth, K is the Boltzmann constant, T is temperature, and $Rx_{NF}$ is receiver noise figure. Interestingly, the offset cancellation is independent of bandwidth and depends on transmit power, phase noise of the carrier, and receiver noise figure. With respect to an example LoRa transceiver, $Rx_{NF}$=4.5 dB, so for $P_{CR}$=30 dBm, $CAN_{OFS} - L_{ES(\Delta f)} > 199.5$ dB.

FIG. 3 illustrates the above-described requirements. Before cancellation, the backscattered signal 302 is buried under the carrier phase noise 304, but, after cancellation, the carrier phase noise 304 is pushed below the receiver noise floor. The inequality shows that offset cancellation is associated with a joint design of the carrier source and the cancellation network. If a high-phase-noise carrier was used, then a high offset cancellation would be used. In contrast, if the phase noise of the carrier source is lowered, then the offset cancellation requirements may be relaxed.

Carrier and offset cancellation requirements may typically relax with an increase in offset frequency. However, increase in subcarrier frequency increases power consumption of the backscatter tag. Thus, frequency offset presents a trade-off between tag power consumption and cancellation requirements.

Therefore, in some embodiments, between 2-4 MHz may be used as the offset. In some embodiments, a 3 MHz offset frequency may be used. In some embodiments, the offset frequency may be variable during operation of the backscatter tag and/or system. In some embodiments, the backscatter system may provide information to the backscatter tag which indicates selection of an offset frequency.

Block Diagram—Example Backscatter System

FIG. 4A is a block diagram of an example full-duplex backscatter system 400 (e.g., a backscatter reader, a backscatter apparatus, an apparatus, and so on). In the illustrated example, a coupler 402 (e.g., a hybrid coupler) is illustrated as being connected to, or otherwise in signal communication with, an antenna 404, a transmitter 406, a tunable impedance network 408, and a receiver 410. Since the system 400 is full-duplex, the antenna 404 may be used for transmission and receive. In some embodiments, the transmitter 406 may represent a frequency synthesizer in combination with a power amplifier. As described above, with respect to FIGS. 2-3, the tunable impedance network 406 may use passive components, in an effort to reduce cost, complexity, power consumption, and/or noise. In this way, the cancellation described herein may be in the analog domain.

A microcontroller 412, as will be described, may control, or otherwise provide instructions to, the transmitter 406, receiver 410, and tunable impedance network 408. Additionally, the microcontroller 412 may receive, or determine, information from the receiver 410. For example, received signal strength indication (RSSI), or other power level, readings may be obtained, or determined, from the receiver 410. In this example, the RSSI readings may be used by the microcontroller 412 to adjust the tunable impedance network 408. As an example, the microcontroller 412 may set values of tunable passive elements (e.g., tunable capacitors) in the tunable impedance network 408.

The coupler 402, as is known, may have a threshold number of ports. In the illustrated example, the coupler 402 has four ports. In some embodiments, the transmitter may be connected to, or otherwise in signal communication with, the input port (1). The receiver 410 may be connected to, or otherwise in signal communication with, the isolated port (3). The antenna 404 may be connected to, or otherwise in signal communication with, the output port (2). The tunable impedance network 408 may be connected to, or otherwise in signal communication with, the coupled port (4).

The carrier signal from the transmitter 406 (e.g., a signal tone carrier) splits between the antenna 404 and coupled port, leaving the receiver 410 isolated (e.g., substantially isolated). A received signal at the antenna port is split between receiver 410 and the transmitter 406, leaving the tunable impedance network 408 isolated. Couplers may be understood to be reciprocal elements, such that the signal split described above is symmetrical.

In an ideal scenario, the single tone carrier would fully go to the antenna (e.g., low Tx insertion loss) and the entire received signal from the antenna would go to the receiver (e.g., low Rx insertion loss). A higher coupling factor may direct more of the single tone carrier to the antenna 404 at the cost of reducing signal transmission from the antenna 404 to the receiver 410. An example technological goal may be to increase, or maximize, communication range. Thus, the sum of transmit and receive insertion losses may be reduced or substantially minimized. A hybrid, or 3 dB coupler, may therefore be used and equally divide the input power between the output and coupled port. In this way, total loss may be reduced to, for example, 6 dB.

Two factors may, as an example, limit the practical self-interference cancellation of a hybrid coupler. First, every coupler has leakage with a typical common off the shelf (COTS) coupler providing about 25 dB of isolation between the transmit and receive ports. As may be appreciated, this may be lower than required for successful operation of the backscatter system 400. Second, the antenna may limit cancellation. Typical antennas, including low-cost planar inverted-F antennas (PIFAs), may be characterized by −10 dB return loss and any reflection from the antenna port may couple to the receiver 410 and further contribute to the SI.

With respect to the antenna 404, environmental variations may additionally affect antenna impedance. For example, nearby objects can detune the antenna 404 and/or create additional reflections which contribute to variation in its reflection coefficient. Since self-interference cancellation is, at least in part, based on antenna impedance, the expected variation may be identified or determined. An example technique to determine the variation may include the following, although additional techniques may be used or the information may be previously identified. For example, a 1.9 in×0.8 PIFA may be used to quantify antenna impedance variation. The PIFA may be connected to a network analyzer and subjected to environmental variations. The PIFA may be placed upright on a table and the $S_{11}$ measured as a hand and/or other objects approach it from different directions. Via this testing, the magnitude of reflection coefficient, $|\Gamma|$, may, as an example, reach a maximum of 0.38 and thus expected $|\Gamma|$ may be set at less than 0.4 for the antenna.

With respect to the tunable impedance network 408, reference will be made to portion 414 which illustrates cancelation of signals. A signal 416 from the transmitter 406 (e.g., the single tone carrier) may be split between the antenna port and coupled port of the coupler 402. The impedance at the coupled port may be tuned via the tunable impedance network 408 such that the reflection 418 (e.g., reflection from the network 408) from the port cancels out both the leakage of the coupler and the reflection 420 (e.g., from the antenna 404) from the antenna port to achieve substantial cancellation at the receive port 414 (e.g., cancellation of the signal tone carrier at an input of the receiver 410). As an example, in the worst case of a significantly detuned antenna 410, the reflection 420 from the antenna may be substantially stronger than the leakage. Thus, reflection 418 from the tunable impedance network 408 may substantially cancel the reflection 420 (e.g., of the single tone carrier) from the antenna 404. For example, the cancellation may occur at the coupler, at an output of the coupler which is connected to the receiver 410, and so on.

Figure 5:
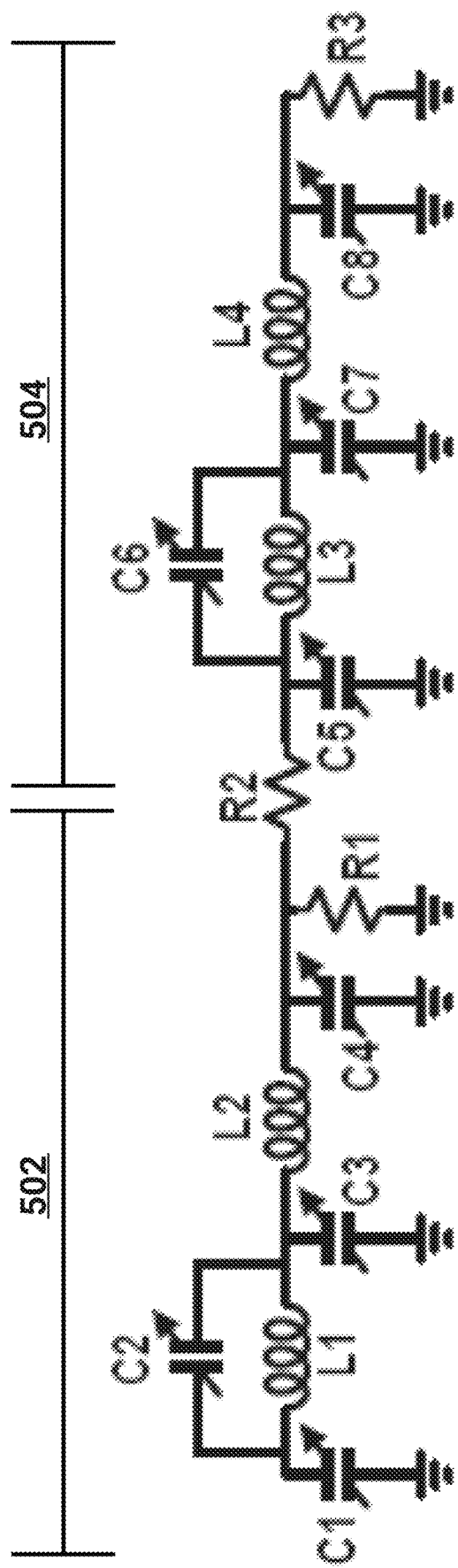
FIG. 5 illustrates an example of a tunable impedance network.

Reference will now be made to FIG. 5 which illustrates an example of the tunable impedance network 408. In the illustrated example, the tunable impedance network 408 may be a two-stage 502-504 tunable impedance network. In a tuning network terminated with a resistor, and as may be appreciated, a small portion of the signal (e.g., less than a threshold) may be reflected with most of it being dissipated. Each stage of the network 408 may include a first threshold number of fixed inductors (e.g., two inductors) and a second threshold number of digitally tunable capacitors (e.g., four capacitors) terminated with a resistor. This arrangement allows the network 408 to cover the range of expected impedance values required to cancel reflections 420 (e.g., strong reflections) from the antenna 404. The termination resistor for the first stage 502 may be replaced with a resistive signal divider, followed by the second stage 504.

The signal reflected by the second stage 504 flows through the resistive divider twice, effectively lowering the impact of impedance changes in the second stage 504 on the overall reflected signal. This allows the microcontroller 412 to make finer changes, increasing the tuning resolution and enabling deep cancellation. However, tuning range and offset cancellation may, as an example, be determined by the first stage 502. The second stage 504 provides the fine resolution to accurately match the reflection from the balanced port of the coupler 402 with the leakage and reflection from the antenna port. To eliminate dead zones, the resistive divider is selected such that the fine tuning network (e.g., the second stage 504) covers the step size of the coarse tuning network (e.g., the first stage 502).

With reference to FIG. 4A, the tunable impedance network 408 may have, as an example, eight digital capacitors, each with a threshold number of control bits (e.g., 4 bits, 5 bits, 7 bits). In the example of five bits with eight capacitors, a total of 40 bits may be used. This results in $2^{40}$ (e.g., about 1 trillion) states for the impedance network 408. Multiple capacitor states can result in the impedance required for, as an example, 78 dB cancellation. As it is impractical to search across such a vast space in real time, the microcontroller 412 may determine values in substantially real-time during operation of the system 400. Thus, the microcontroller may provide information specifying values for the control bits.

In some embodiments, the microcontroller 412 may use a simulated annealing algorithm to tune the capacitors. The microcontroller 412 may optionally tune each stage separately. As may be appreciated, simulated annealing is based on the physical process of heating, and then slowly cooling, a material to minimize defects in its structure. Simulated annealing may use the concept of temperature to control the probability of choosing a direction which does not lower the RSSI (e.g., to prevent settling in a local minima). The higher the temperature, as an example, the higher the probability of steps being in the wrong direction. As simulated annealing is run, the temperature gets reduced to about zero such that final values of the capacitors (e.g., capacitance values) are determined.

For every temperature value, the microcontroller 412 can take, for example, ten steps. At each of the steps, the microcontroller 412 can add a random value bounded by a maximum step size to each capacitor and measure the self-interference using the receiver's 410 RSSI measurement as described above.

The microcontroller 412 can select the new capacitor values if the self-interference decreases, or with a temperature-dependent probability when the self-interference increases. In some embodiments, the microcontroller 412 can initiate with a temperature equal to a particular number (e.g., 512, 1024) and divide it by two each round until it reaches one. The microcontroller 412 can set, or access, predefined cancellation thresholds for each stage and terminate the tuning once the thresholds are met. If the first stage 502 reaches the threshold (e.g., −50 dBm), but the second stage 504 fails to do so, the microcontroller 412 can repeat the tuning until either it converges, or a timeout is reached.

While the above describes use of annealing, in some embodiments additional or different tuning techniques may be used. For example, gradient descent may be used. As another example, a neural network may be used such that an input RSSI value, or a threshold number of recent RSSI values, may causes an output of capacitor values. As another example, a lookup table may be used to identify capacitor values based on RSSI values. In this example, the lookup table may optionally identify capacitor values for a subset of RSSI values. The microcontroller may then search for specific capacitor values based on a specific RSSI value (e.g., a closest RSSI value in the subset may be selected).

In this way, the microcontroller 412 may adjust the tunable impedance network 408 in substantially real-time to effectuate a threshold level (e.g., 78 dB) of self-interference cancellation in the analog domain. Thus, the single tone carrier may be reduced such that the receiver 410 may successfully read in the reflected backscatter data packets from the antenna 404 (e.g., as illustrated in FIG. 1B).

The microcontroller 412 may additionally control, at least in part, the transmitter 406, receiver 410, and tunable impedance network 408. For example, a serial peripheral interface (SPI) may be used. The microcontroller 412 may implement a state machine to transition between tuning, downlink, and uplink operating modes. For example, in the tuning mode, the microcontroller 412 may first configure the center frequency and power of the transmitter 406 and then tune the tunable impedance network 408 to reduce self-interference. In this example, the microcontroller 412 may use the above-described simulated annealing technique to tune the capacitors of the network 408. Subsequently, the microcontroller 412 may transmit (e.g., via the antenna 404) a message indicating downlink is ok. This message may be used to wake up a backscatter tag. The microcontroller 412 may then transition to an uplink mode where it configures the receiver 410 to decode data packets from the backscatter tag. With respect to use of the LoRa protocol, the microcontroller 412 may provide the appropriate LoRa protocol parameters to decode received backscattered packets.

The microcontroller 412 may then repeats the above for a next hopping frequency. For example, the microcontroller may select a next single tone carrier (e.g., center frequency) and perform an updated tuning of the tunable impedance network. As may be appreciated, the backscatter system 400 may operate at greater than 30 dBm. Thus, frequency hopping may be mandated (e.g., by a governmental entity). In frequency-hopping systems, the channel dwell time may be less than 400 ms, and the packet length may thus be limited to be shorter than that limit. This corresponds to a sensitivity of −134 dBm as illustrated in FIG. 2.

FIG. 4B illustrates another example backscatter system 450 (e.g., a backscatter reader, a backscatter apparatus, an apparatus, and so on) which includes additional tunable capacitors 452-454 and optionally inductor 456. The tunable capacitors 452-454 may be used for antenna tuning in addition to the tunable impedance network described above. As may be appreciated, these capacitors 452-454 may be dynamically adjusted by the microcontroller to adjust for impedance variation of the antenna and thereby reduce the expected variation in the magnitude of reflection coefficient of the antenna, for example $|\Gamma|<0.2$. The reflection coefficient is described in more detail above. For example, the tunable impedance network with a relaxed impedance coverage map may be tuned as described herein. The tunable capacitors 452-454 can then be adjusted to reduce RSSI. In some embodiments, the microcontroller may use gradient descent to adjust the capacitors 452-454.

Example Implementation—Backscatter System

An example implementation of the backscatter system of FIG. 4A is described below. As may be appreciated, additional implementations may be used and fall within the scope of the disclosure herein.

The backscatter system may be operated in 902-928 MHz on a 3.8 in×1.9 in, 4-layer, FR4 printed circuit board. RF elements (e.g., antenna, transmitter, receiver, and tunable impedance network) may be included on the top side of a PCB, and the microcontroller and power management on the bottom side. The tunable impedance network may include a 90° hybrid coupler and the above-described two-stage tunable impedance network.

With reference to FIG. 5, variable capacitors $C_1$-$C_8$ may have 32 linear steps between 0.9 pF-4.6 pF. Inductors $L_1$, $L_3$ may be set to 3.9 nH and $L_2$, $L_4$ may be set to 3.6 nH. Resistors $R_1$, $R_2$ and $R_3$ may be set to 62 Ω, 240 Ω and 50 Ω respectively. A synthesizer may be used to generate a single-tone carrier. The output power of the generated single-tone carrier can be amplified up to 30 dBm using a power amplifier. In some embodiments, the tunable impedance network may have an expected loss of 7-8 dB; 6 dB of which is the theoretical loss due to hybrid coupler architecture. The rest may be due to component non-idealities.

A coplanar inverted-F antenna may be integrated into the above-described PCB. The radiating element of the antenna may measure 750 mm×1874 mm and leverage the existing ground plane for omnidirectional radiation.

In applications where power is a constraint, the transmit power of the backscatter system can be reduced to lower the overall power consumption. In some embodiments, the microcontroller may adjust the transmit power in substantially real-time. Additionally, at lower transmit power, the cancellation requirements may be relaxed, allowing the substitution of the synthesizer with a higher-phase-noise transmitter. Since phase noise is inversely proportional to power consumption, this design choice, together with lower power configuration or elimination of the power amplifier, may reduce the overall power consumption.

Example Implementation—Backscatter Tag

With respect to LoRa, the LoRa baseband and subcarrier chirp spread spectrum modulated packets may be generated using Direct Digital Synthesis (DDS) on a field-programmable gate array (FPGA). The output of the FPGA may be connected to an RF switch to synthesize single-side-band backscatter packets. The backscatter tag design may also incorporate an On-Off Keying (OOK) based wake-on radio with sensitivity down to at least −55 dBm and a single pole double throw (SPDT) switch to multiplex a 0 dBi omnidirectional PIFA between the receiver and the backscatter switching network. The total loss in the RF path (SPDT +SP4T) for backscatter may be about 5 dB.

Example Flowchart—Backscatter System

Figure 6:
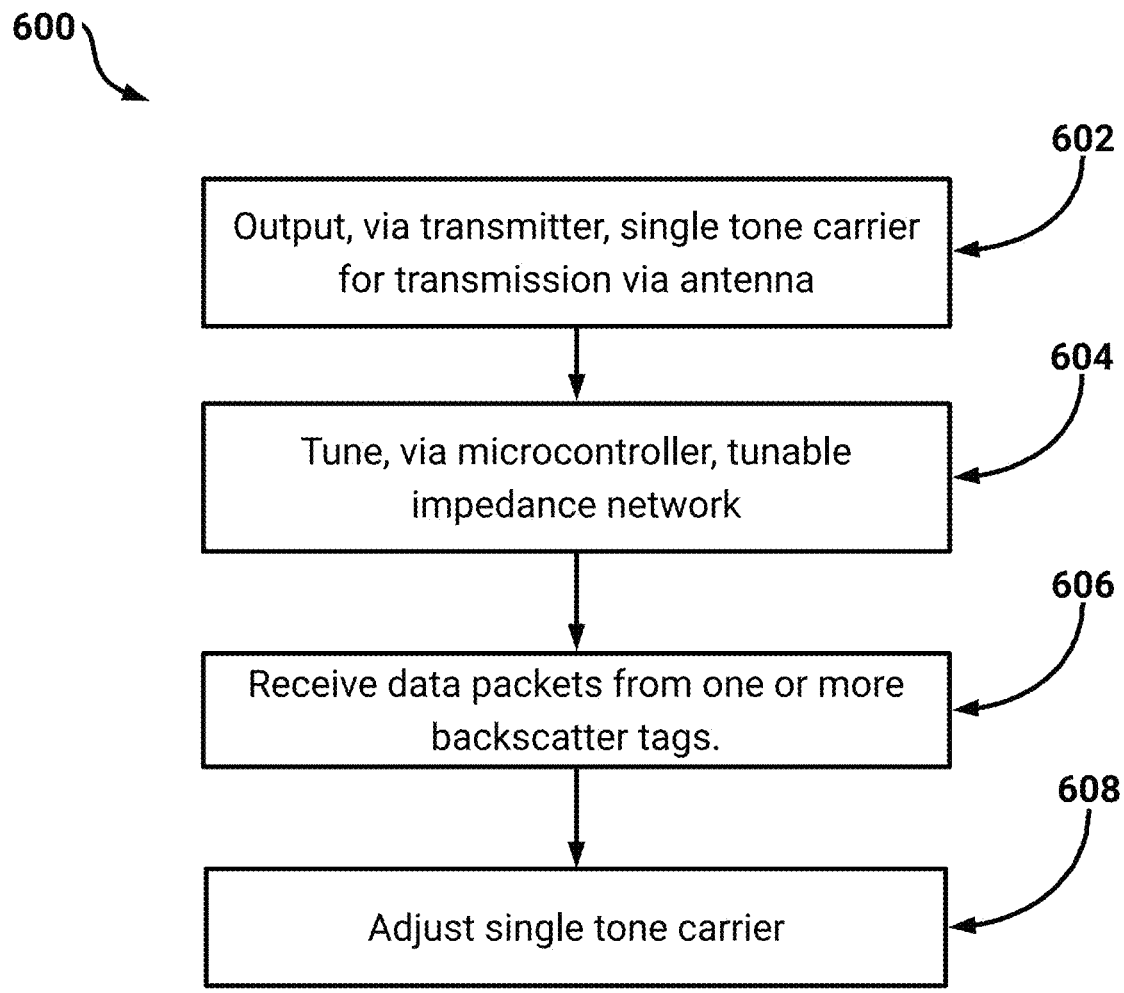
FIG. 6 is a flowchart of an example process which may be implemented by a full-duplex backscatter system.

FIG. 6 is a flowchart of an example process 600 which may be implemented by a full-duplex backscatter system (e.g., a backscatter reader). For example, the process 600 may be implemented by the backscatter system illustrated in FIGS. 4A-4B.

At block 602, a transmitter outputs a single tone carrier signal for transmission via an antenna. As described above, a microcontroller of the system may be used to control a transmitter. For example, the microcontroller may set a center frequency and power of the single tone carrier. The transmitter may then output the single tone carrier, for example via a synthesizer and power amplifier.

The single tone carrier is provided to a coupler (e.g., a hybrid coupler). In some embodiments, the coupler may be a 3 dB coupler which equally (e.g., substantially equally) divides input power between an output and coupled port. The coupler thus splits the single tone carrier power between an output, which is connected to the antenna, and a coupled port, which is connected to a tunable impedance network. As illustrated in FIG. 4A, the receiver may be connected to an isolated port of the coupler.

At block 604, the microcontroller tunes the tunable impedance network. As described in FIG. 4A, the microcontroller obtains, or measures, receive signal strength indication (RSSI) at the receiver. For example, the RSSI measurements may indicate an extent to which the receiver is receiving signal power via the coupler.

The microcontroller performs an example technique to select values for capacitors included in the tunable impedance network. For example, the simulated annealing technique described in FIG. 4A may be performed. As another example, gradient descent may be performed to search for values in a search space associated with values of the tunable capacitors. As may be appreciated, the single tone carrier provided by the transmitter may be, at least in part, reflected by the tunable impedance network. Additionally, the single tone carrier may be reflected, at least in part, by the antenna. While the isolated port may ideally block power, in practical implementations there may be leakage from the coupler which is transmitted to the receiver.

The microcontroller tunes the tunable impedance network to, at least, substantially cancel the reflection from the antenna. As described in FIG. 4A, a signal received by the port of the coupler which is connected to the antenna may be split between the port connected to the transmitter and the port connected to the receiver. Thus, the reflection from the antenna may be provided, at least in part, to the receiver. In canceling the reflection from the antenna, the tunable impedance network thus cancels (e.g., reduces) the signal power of the reflection as received by the receiver. In this way, the RSSI may be used to adjust the tunable capacitors until the RSSI is below a threshold or until a time limit is reached.

As described herein, the tunable impedance network may thus reduce single tone carrier as received by the receiver by, at least, 78 dB. Advantageously, the reduction may be performed in the analog domain. The receiver has an example blocker tolerance which may be leveraged to further reduce the signal tone carrier. In this way, the single tone carrier as received by the receiver may be reduced such that data packets which are backscattered by a backscatter tag may be successfully received.

At block 606, the receiver receives one or more data packets from one or more backscatter tags. In some embodiments, the microcontroller may tune the tunable impedance network prior to data packets being received from a backscatter tag. For example, the microcontroller may tune the network and then output information indicating that the backscatter tags can provide data packets. For example, and as described above, one or more packets may be sent to the backscatter tags (e.g., downlink OOK-modulated packets). The data packets may then be received (e.g., during a receive window).

The microcontroller may additionally configure the receiver with appropriate parameters to read (e.g., decode) the data packets. With respect to the example of LoRa, the microcontroller configures the receiver with LoRa parameters. Example parameters may include one or more of spreading factors, carrier frequency (e.g., single tone frequency, offset frequency), bandwidth settings, coding rates, transmission powers, packet parameters (e.g., preamble length, packet length), and so on. In this way, the backscatter system may ensure that the backscatter packets can be successfully read via cancelling of the single tone carrier (e.g., during full duplex operation).

The output single tone carrier may be used by the backscatter tag to output backscattered data packets as described above. The backscatter tag synthesizes these data packets at an offset frequency from the signal tone carrier, which may be 3 MHz. The offset may also be a value selected between 2-4 MHz, 2-5 MHz, 3-5 MHz, and so on. Thus, the receiver receives a signal representing the data packets. This signal is provided to the coupler described herein, which splits the signal between the transmitter and receiver. The tunable impedance network may represent the isolated port for the received signal.

Subsequent to receiving data packets, such as subsequent to a receive window, the microcontroller may optionally adjust the tunable impedance network. In some embodiments, the microcontroller may cause information to be provided to the backscatter tags which causes them to cease transmission of data packets. The microcontroller may then adjust the network using the single tone carrier as described above.

During receipt of data packets, the microcontroller may optionally adjust the tunable impedance network. For example, the RSSI values may be monitored. In this example, the microcontroller may determine that the RSSI values exceed a threshold or that certain data packets are unable to be read. The tunable impedance network may therefore be adjusted during operation of the backscatter system. For example, the microcontroller may track variations in antenna impedance and/or environmental reflections and adjust a subset of the capacitor values (e.g., capacitors C1-C8 illustrated in FIG. 5).

At block 608, the microcontroller adjusts the single tone carrier. In some embodiments, the microcontroller may adjust (e.g., hop) to a different single tone carrier. Thus, the microcontroller may tune the tunable impedance network using the adjusted signal tone carrier. Similar to the above, the microcontroller may then cause data packets to be received via the backscatter tag.

Examples of Implementation and Testing

The following description is included for explanatory purposes and not to limit the disclosure above. Certain values of components may be adjusted and fall within the scope of the disclosure herein.

The above-described cancellation approach may be checked by measuring the carrier and offset cancellation of the two-stage impedance tuning network. Then, the time overhead incurred by the tuning approach may be measured. Next, the full-duplex (FD) Long Range (LoRa) Backscatter system performance in a wired setup is measured to isolate multi-path effects followed by line-of-sight and non-line-of-sight wireless deployments. Finally, the performance of the mobile version of the system is measured.

Figure 7:
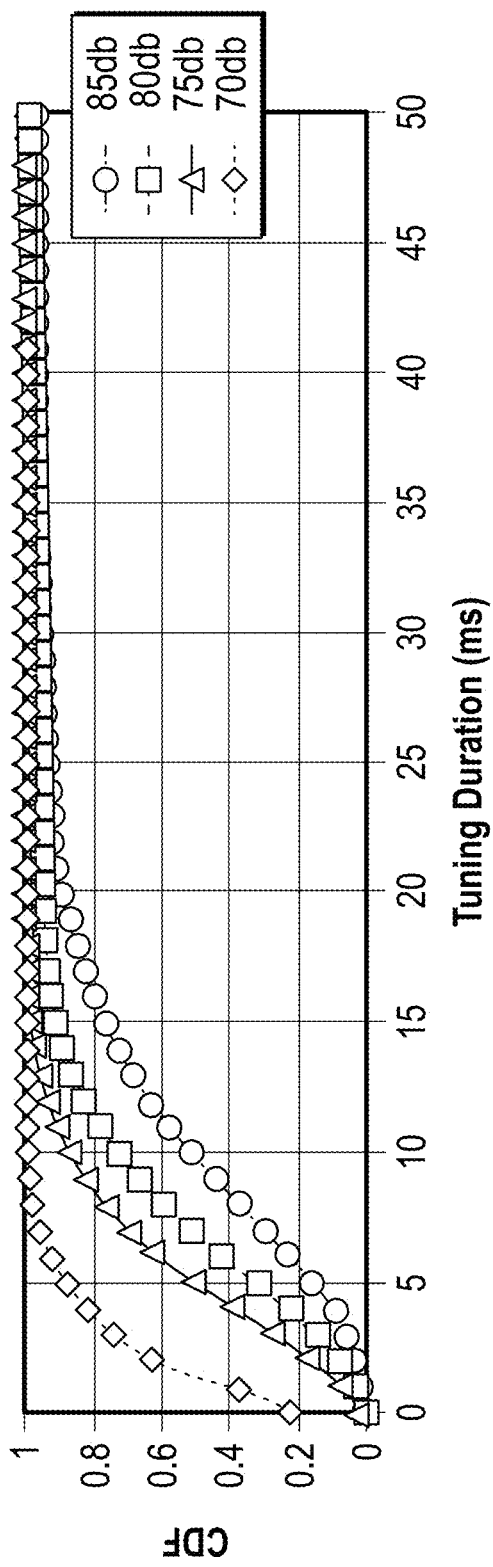
FIG. 7 illustrates example tuning overhead.

Unless mentioned otherwise, the transmit power may be set to 30 dBm and configure a backscatter tag to transmit 1,000 packets with SF=12, BW=250 kHz, (8,4) Hamming Code with an 8-byte payload with a sequence number for calculating PER, and a 2-byte CRC. Additionally, uplink is initiated by sending a downlink OOK-modulated packet at 2 kbps to wake up the tag and align the tag's backscatter operation to the carrier. Downlink also enables channel arbitration between multiple tags, sending acknowledgements, packet re-transmissions, and many other functionalities To measure the performance of the tuning technique, the FD LoRa Backscatter system with the PIFA may be placed on a table in a typical office environment. 10,000 packets from a tag placed 20 ft away may be collected over the course of 80 minutes with multiple people sitting around and walking by the system. The target SI cancellation threshold in the tuning algorithm may be modified to 70, 75, 80, and 85 dB and run experiments to measure the time required for tuning. The CDF of tuning overhead may be plotted for different cancellation thresholds as illustrated in FIG. 7. As expected, the tuning duration may increase with an increase in target threshold. For a threshold of 80 dB, the average tuning duration is 8.3 ms, which corresponds to an overhead of only 2.7%. Each tuning step takes about 0.5 ms, dominated by the microcontroller SPI transactions and settling time of the receiver. An RF power detector may optionally be used to provide faster feedback at the expense of increased cost.

To evaluate the receive sensitivity of the FD LoRa Backscatter system without the effect of multi-path signal propagation, an equivalent wired setup may be setup. RF cables and a variable attenuator may be used to connect the antenna port of the FD LoRa Backscatter system to a LoRa backscatter tag. The in-line attenuator may be varied to simulate path loss which corresponds to different operating distances between the reader and the tag. An attenuator value at which all packets are received may be selected and then the attenuation may be slowly increased until no packets are received.

Figure 8:
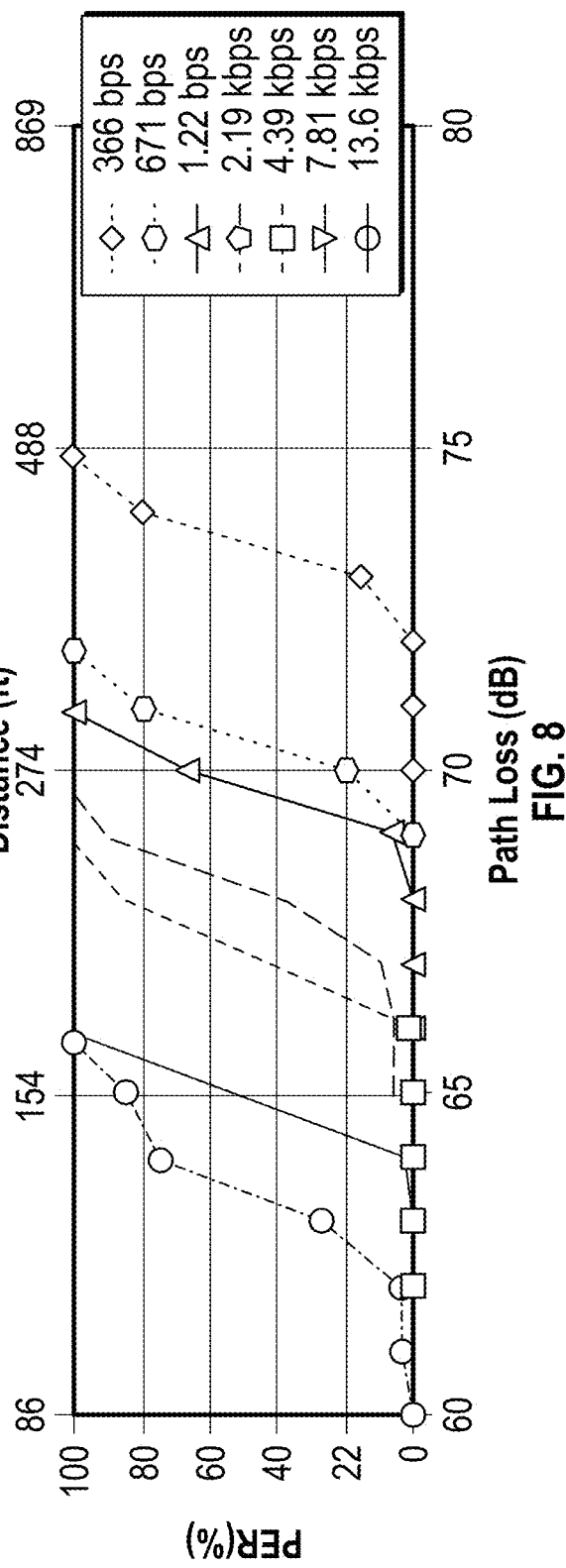
FIG. 8 illustrates PER as a function of path loss in a wired setup for different data rates.

FIG. 8 illustrates PER as a function of path loss in a wired setup for different data rates. Since sensitivity is inversely proportional to data rates, lower data rates can operate at higher path loss which translates to longer operating distances. For a PER≤10%, the expected LOS range at the lowest data-rate of 366 bps is 340 ft, with the range decreasing successively for higher bit rates, down to 110 ft for 13.6 kbps.

Figure 9A:
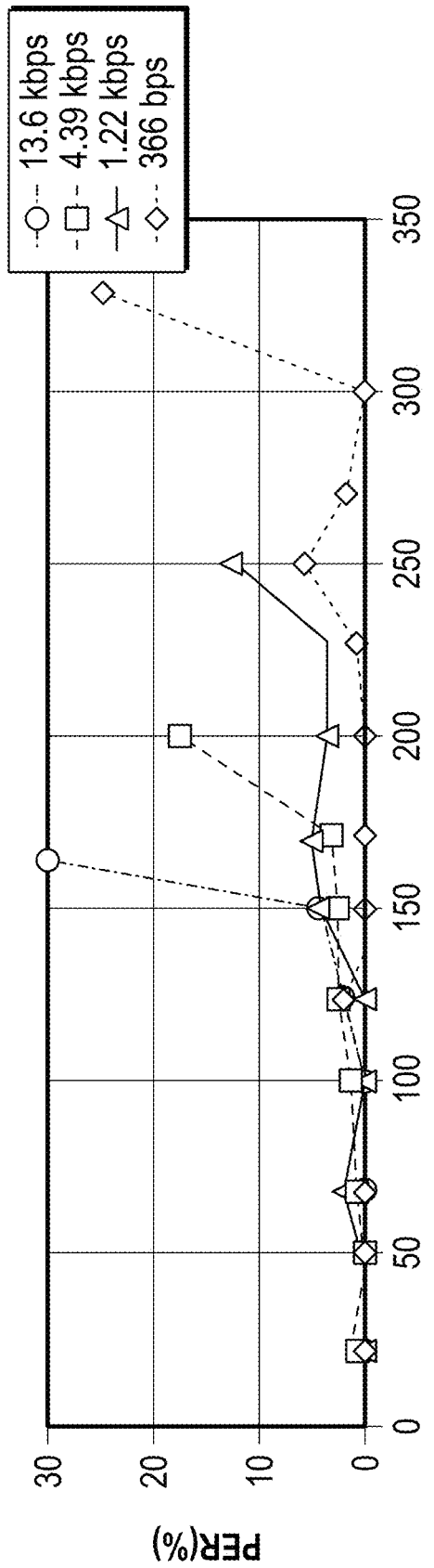
FIGS. 9A-9B illustrate open field performance.
Figure 9B:
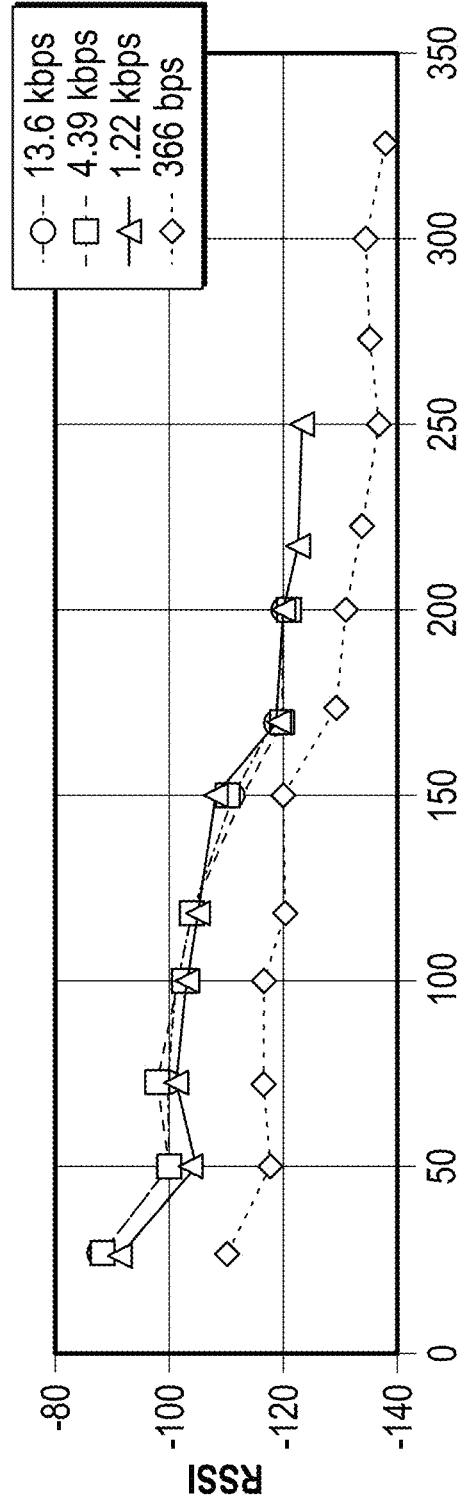

The FD LoRa Backscatter system may be deployed in an open field to measure LOS performance. An 8 dBiC circularly polarized patch antenna may be connected to the antenna port and placed on a 5 ft tall stand. The backscatter tag may be placed at the same height and moved away in 25 ft increments. FIG. 9A illustrates PER and RSSI as a function of distance for four different data rates. Results show that for PER<10% at the lowest data rate, the system can operate at a distance of up to 300 ft with a reported RSSI of −134 dBm. For the highest bit rate, the operating distance was 150 ft with a reported RSSI of −112 dBm. Finally, as expected, RSSI decreases as the distance between the reader and tag increase.

Figure 10A:
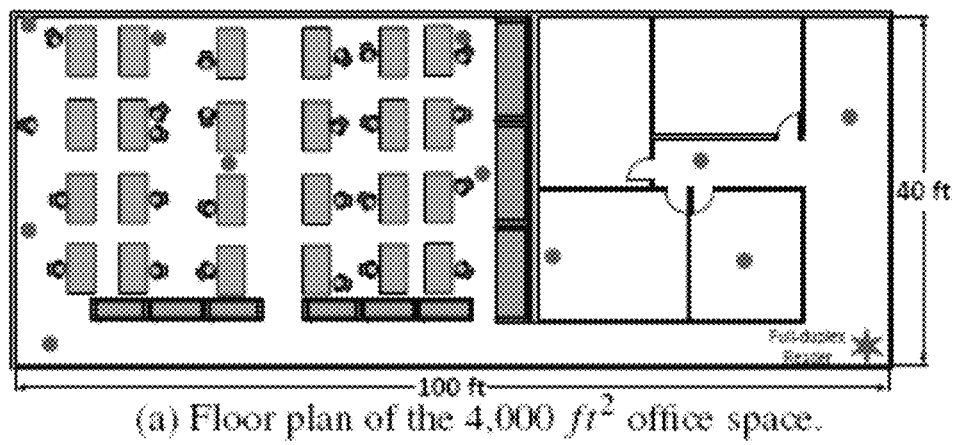
FIGS. 10A-10B illustrate performance in a building.
Figure 10B:
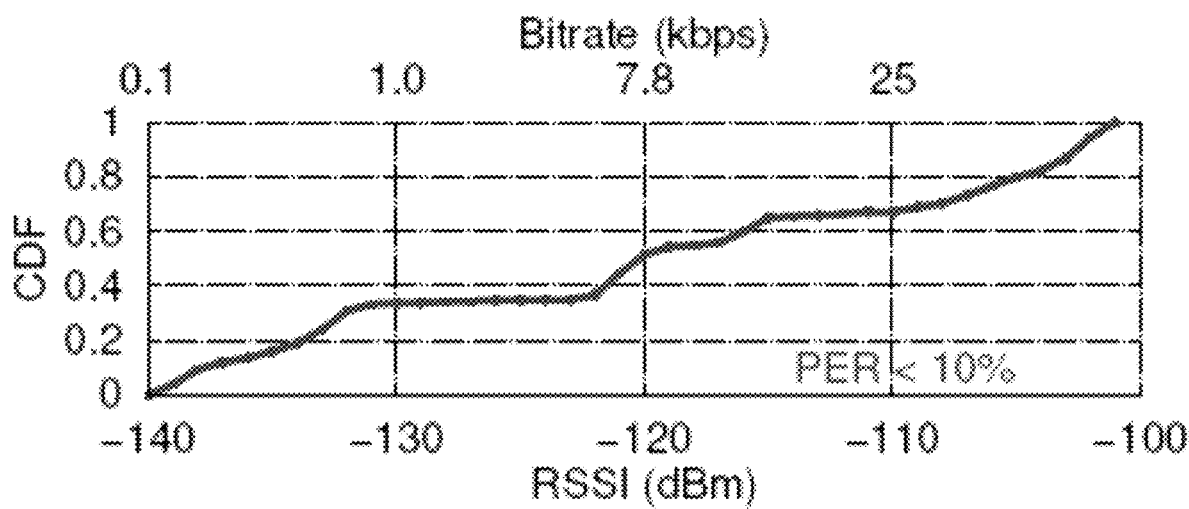

The backscatter system may be set up in a 100 ft×40 ft office building to evaluate performance in a more realistic NLOS scenario. The system may be set in a corner of the building and the backscatter tag moved to ten locations to measure performance down hallways, through cubicles, and through multiple concrete and glass walls. The floor plan of the building is illustrated in FIG. 10A. The star in the lower-right corner indicates the position of the backscatter system and the dots indicate the different locations of the backscatter tag throughout the office space. 1,000 packets are transmitted at each location and a CDF of the aggregated RSSI data from the test is shown in FIG. 10B. A median RSSI of −120 dBm and PER of less than 10% was observed at all the locations demonstrating that the FD LoRa Backscatter system is operational in the office space with a coverage area of 4,000 ft².

Figure 11B:
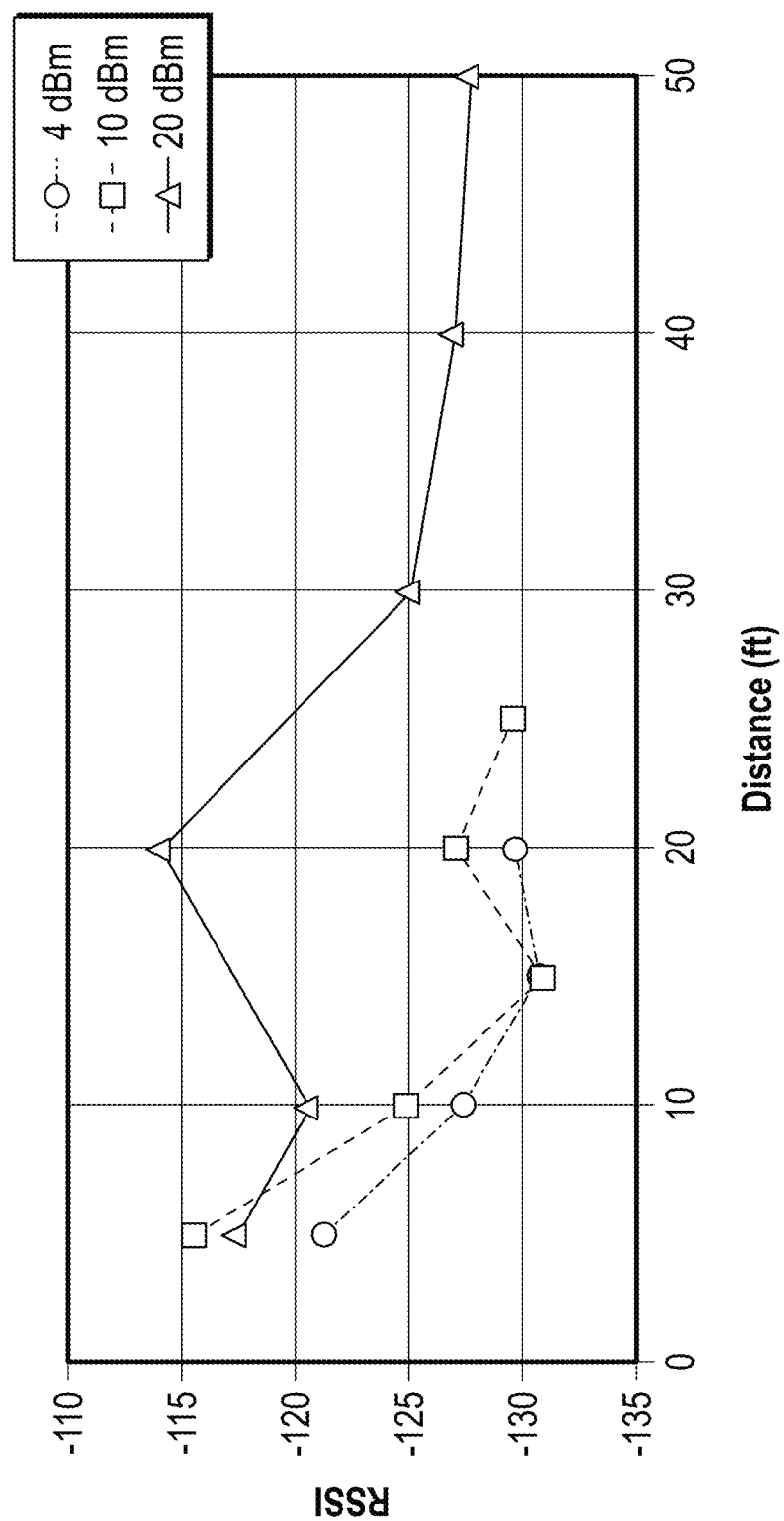

The performance of the mobile version of the backscatter system is evaluated by attaching it to the back of a user device 1100 (e.g., a smart phone) as shown in FIG. 11A. The on-board antenna may be used, and the phone placed face down on a wooden table. The backscatter system then transmits at 4 dBm, 10 dBm, and 20 dBm to resemble the transmit power of mobile devices and the backscatter tag is moved away from the system in 5 ft increments until PER<10%. FIG. 11B plots the RSSI of the received packets as a function of distance. The plots show that at 4 dBm, the mobile reader can operate up to 20 ft and the range increases beyond 50 ft (the length of the room) for a transmit power of 20 dBm. These distances are sufficient for connecting peripheral, wearable, and medical devices to a smartphone using backscatter at extremely low cost, small size, and low power consumption.

Figure 11C:
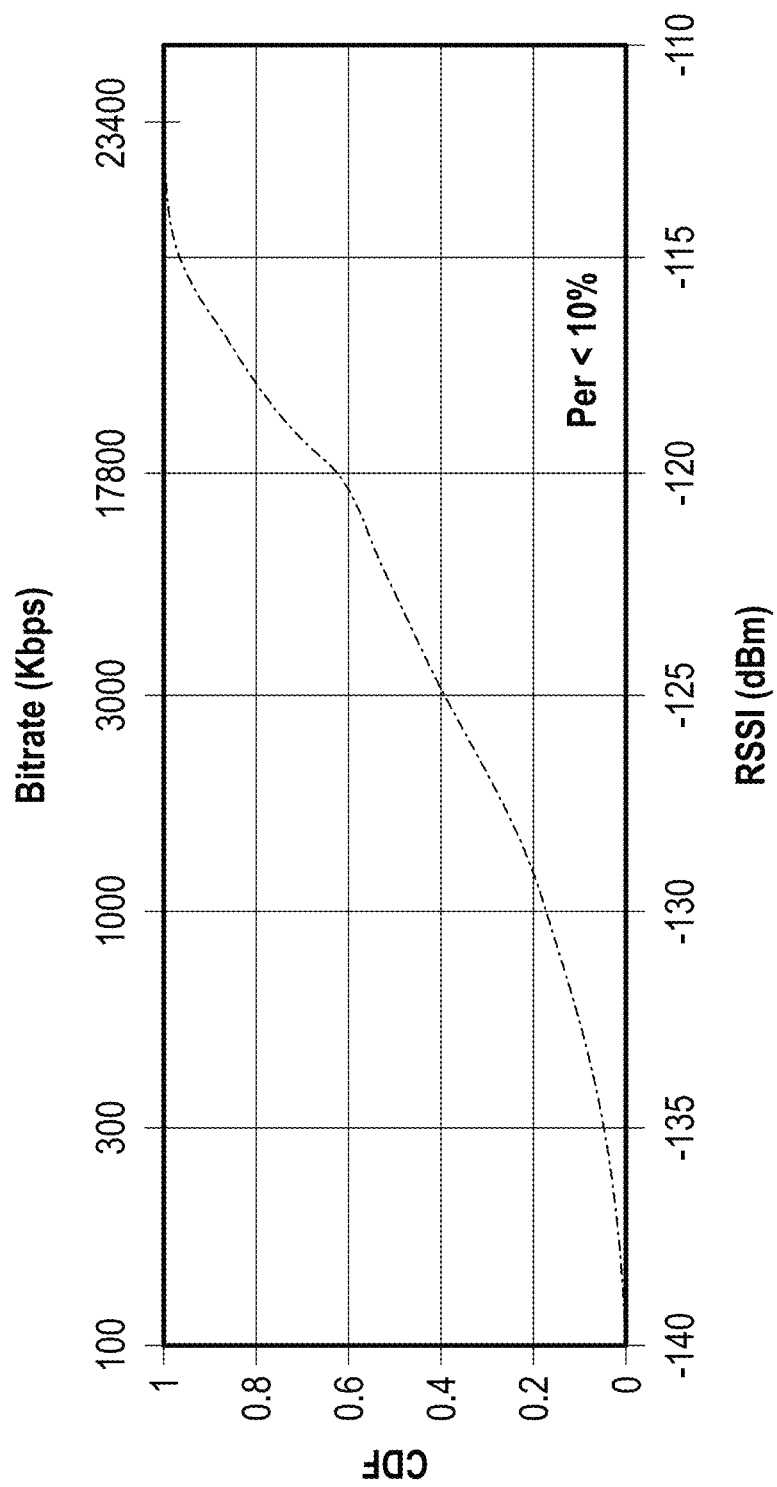

To demonstrate that the tuning algorithm can adapt to variations in environment and antenna impedance, the FD LoRa Backscatter enabled smartphone is placed in a subject's pocket and the transmit power is set to 4 dBm. A backscatter tag is placed at the center of a 11 ft×6 ft table and the subject walks around the perimeter of table receiving more than 1,000 packets. The performance is reliable with PER<10% which demonstrates the efficacy of our tuning algorithm. FIG. 11C plots the CDF of RSSI for all the packets. The backscatter tag measures 2 in×1½ in, resembling the size of a pill bottle. This demonstrates that a mobile FD LoRa Backscatter system integrated into a smartphone can be used to communication with a prescription pill bottle or insulin pen, thereby allowing tracking of medication and drug delivery.

Two example applications for the backscatter system are illustrated. First, a mobile reader collecting data from a smart contact lens 1200 is illustrated in FIG. 12A. Second, a precision agriculture application which mounts the backscatter system to the bottom of a drone which can be flown over farms is illustrated. The drone can use backscatter to collect data from sensors distributed in a field. The use of a single reader coupled with a highly sensitive long-range backscatter protocol enables these applications, even in these challenging deployments.

The mobile FD LoRa Backscatter system mounted on the back of a smartphone described above may be used to communicate with a backscatter tag equipped with a smart-contact-lens-form-factor antenna. The original PIFA of the backscatter system may be replaced with a small loop antenna of 1 cm diameter made with 30 AWG enameled wire. The antenna is encapsulated in two contact lenses and filled with contact lens solution to simulate the RF environment of an eye-ball, as shown in FIG. 12A. Due to its small size and ionic environment, the loop antenna has a loss of 15-20 dB.

Figure 12B:
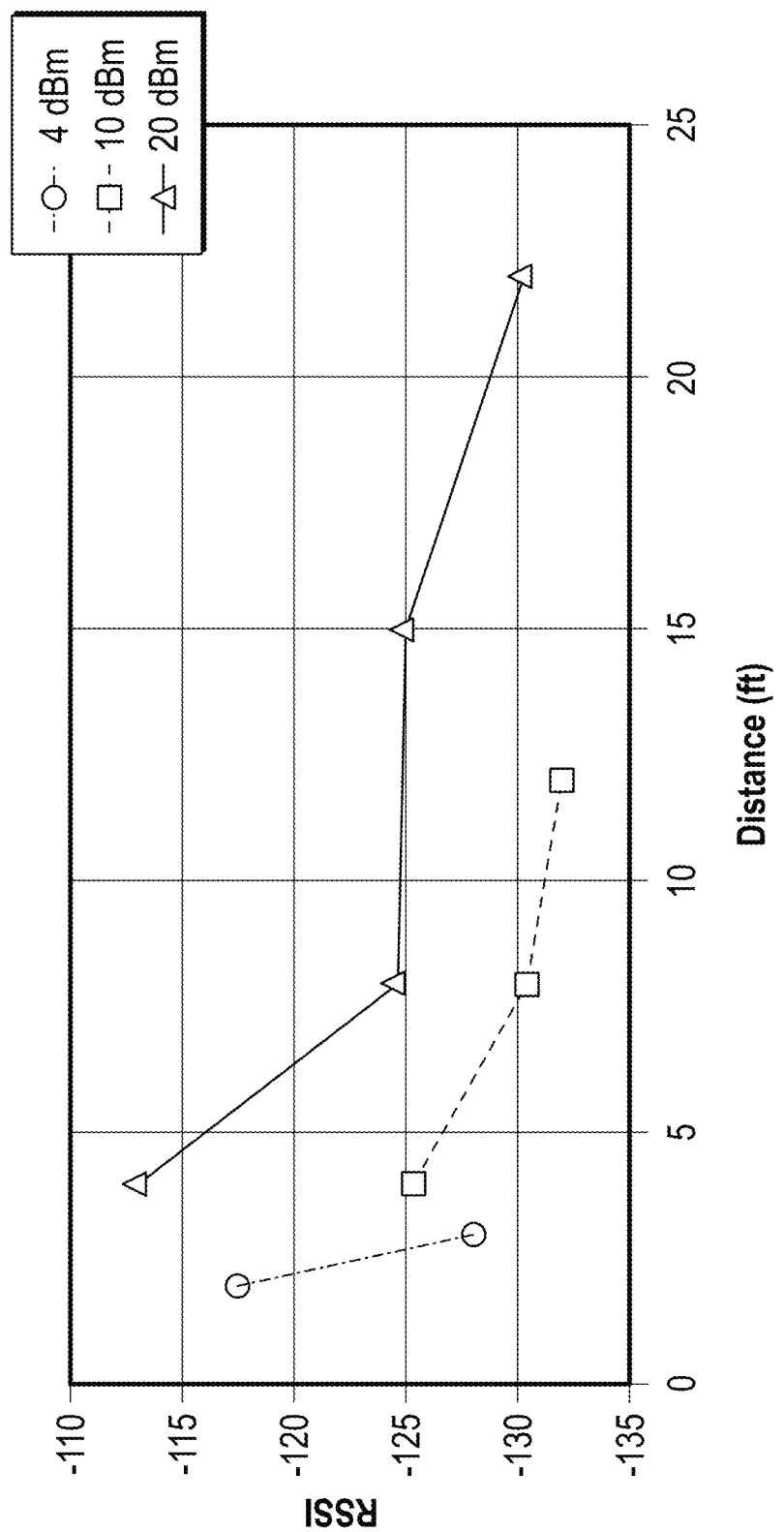
Figure 12C:
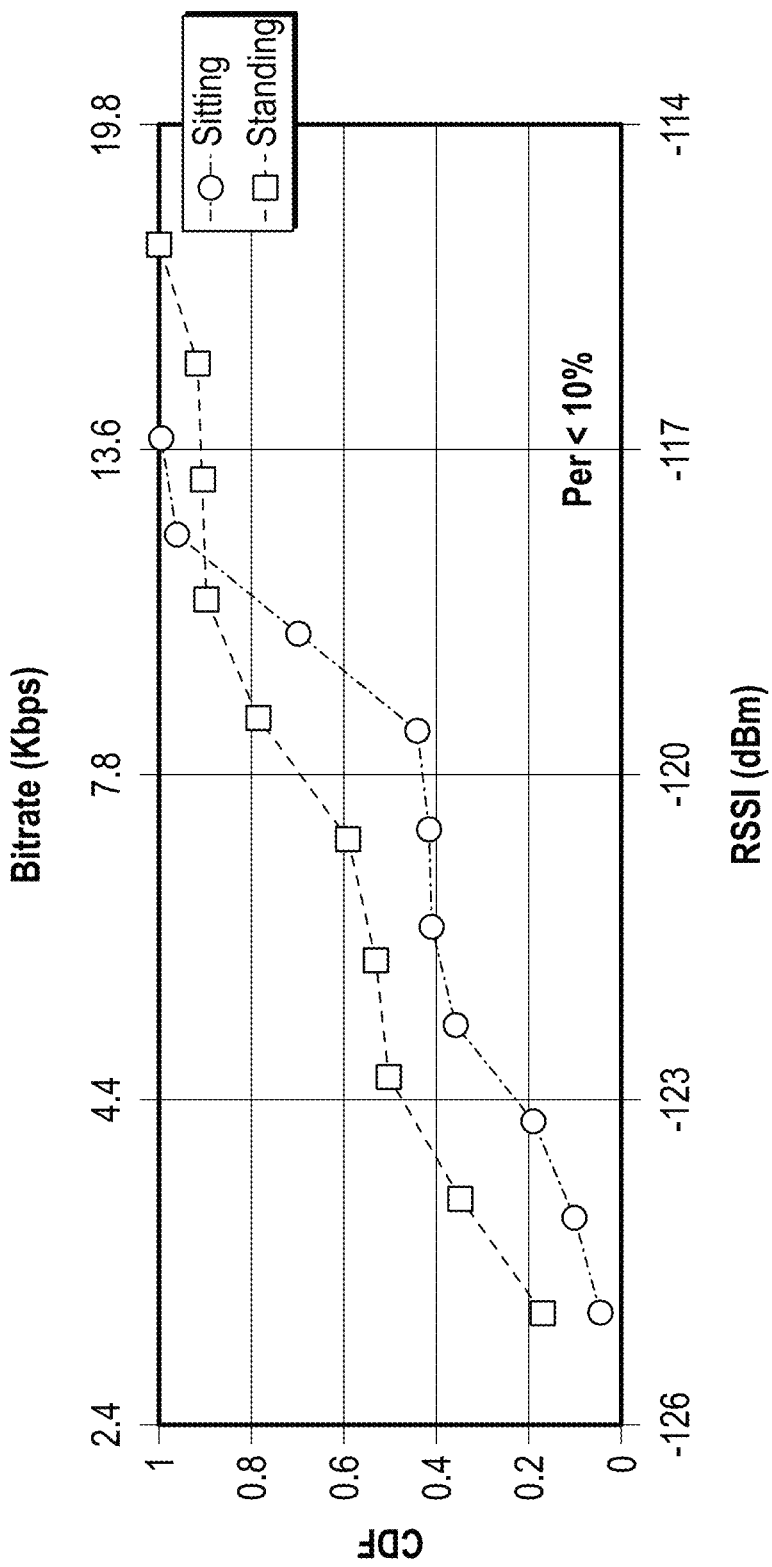

The smartphone may be placed on a table and the mobile reader configured to transmit at 4, 10, and 20 dBm. The contact lens is then moved away from the smartphone. FIG. 12B shows the RSSI as a function of distance for various transmit powers. The mobile reader at 10 and 20 dBm transmit power can communicate with the contact lens at distances of 12 and 22 ft respectively for PER<10%. Next, the mobile reader transmitting at 4 dBm is placed in a 6 ft tall subject's pocket and the contact lens prototype is placed near the subject's eye to simulate a realistic use case. FIG. 12B plots the CDF of the RSSI of decoded packets when the subject was standing and sitting on a chair. The plot shows reliable performance with PER<10% and a mean RSSI of −125 dBm. This demonstrates the feasibility of using backscatter to provide continuous connectivity between a user's phone and a smart contact lens. This RF-challenged application was made possible even at such a low transmit power due to the high receive sensitivity of the system.

Drones are being extensively used for aerial surveillance in precision agriculture. The backscatter system described herein can be used to augment a drone's functionality by adding the backscatter system (e.g., reader) to communicate with sensors distributed in a field using backscatter. The mobile version of the backscatter reader is attached to the bottom of a drone 1300 as shown in FIG. 13A. The reader is powered from the drone's battery using a USB connector to demonstrate the ease of integration. The transmit power is set to 20 dBm to reduce burden on 7.5 watt-hour battery of the cheap drone. Since the reader, as an example, consumes 675 mW at this power level, this corresponds to negligible reduction in drone's flight time. A backscatter tag is placed on the ground simulating an agriculture sensor and fly the drone at a height of 60 ft and allow it to fly laterally to a distance of 50 ft from center, for a total separation of about 80 ft. This corresponds to an instantaneous coverage area of 7,850 ft$^2$.

Figure 13B:
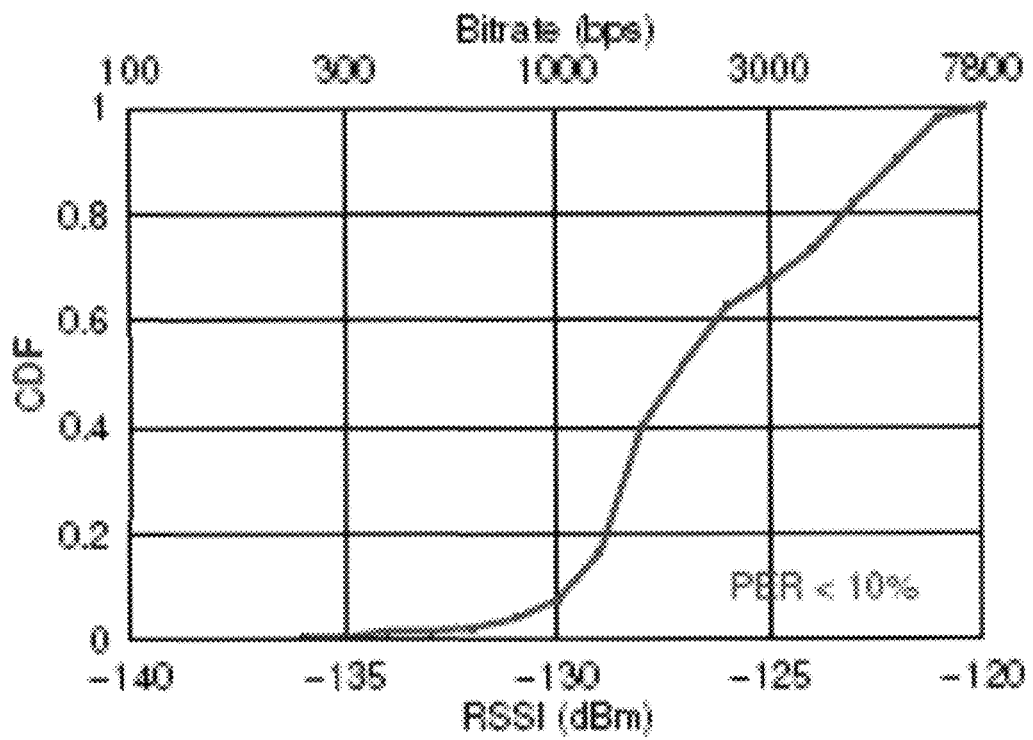

FIG. 13B plots CDF of the RSSI of the packets received by the drone for a PER<10%. With a minimum of −136 dBm and median of −128 dBm, this demonstrates good performance for the area tested. With a flight time of 15 min and a top speed of 11 m/s, the drone could, in theory, cover an area greater than 60 acres on a single charge with a cheap quadcopter. With a more powerful drone with higher payload capacity and longer flight time, one can integrate a higher gain antenna and transmit at higher power. This would result in greater instantaneous coverage area and, with longer flight time, we can achieve many times greater coverage on a single charge.

In one aspect, a duplex long range wireless communication systems and methods include a long range full duplex long range backscatter reader. The system includes a transceiver and a microcontroller in combination with inexpensive passive elements such as a hybrid coupler, inductors, tunable capacitors, and resistors to achieve 78 dB of self-interference cancellation. The system is configured to communicate with a backscatter tag at distances of up to 300 feet in line of sight, and through obstacles, such as walls and cubicles, in an office area of 4,000 ft$^2$ greater. A mobile version of the system conforms to size and power requirements of a smartphone and prototype a contact-lens-form-factor device that can communicate with the mobile reader. The reader can be implemented in a drone for backscatter sensing adapted for precision agriculture with an instantaneous coverage of 7,850 ft$^2$ or greater.

Additional Embodiments

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the glass structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A system configured as a full-duplex backscatter reader, the system comprising:
   an antenna, the antenna being operable to simultaneously transmit and receive;
   a transmitter configured to output a single tone carrier for transmission via the antenna;
   a receiver configured to receive, via the antenna, backscatter data packets from one or more backscatter tags positioned in a real-world environment;
   a tunable impedance network comprising a plurality of passive elements, wherein a portion of the passive elements are tunable, and wherein the tunable impedance network is configured to reflect the single tone carrier to form a reflected signal;
   a coupler, wherein the coupler is connected to the antenna, transmitter, receiver, and tunable impedance network, and wherein based on an input of the single tone carrier via the transmitter the coupler is configured to isolate the receiver from the single tone carrier; and
   a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain, and wherein the microcontroller sets a value of the single tone carrier, and wherein the microcontroller causes tuning of the tunable impedance network prior to receipt of the backscatter data packets.

2. The system of claim 1, wherein the portion of the passive elements are tunable capacitors.

3. The system of claim 1, wherein the tunable impedance network is a two-stage network, wherein the portion of passive elements comprises tunable capacitors, wherein each stage comprises a subset of the tunable capacitors, and wherein the two-stage network comprises a first stage and a second stage, and wherein the second stage is connected to the first stage via a resistive divider.

4. A system configured as a full-duplex backscatter reader, the system comprising:
   an antenna, the antenna being operable to simultaneously transmit and receive;
   a transmitter configured to output a single tone carrier for transmission via the antenna;

a receiver configured to receive, via the antenna, backscatter data packets from one or more backscatter tags positioned in a real-world environment;
a tunable impedance network comprising a plurality of passive elements, wherein a portion of the passive elements are tunable, and wherein the tunable impedance network is configured to reflect the single tone carrier to form a reflected signal;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain, and wherein the receiver is configured to decode the backscatter data packets, wherein the backscatter data packets are provided according to the Long Range (LoRa) protocol, and wherein the microcontroller provides parameters associated with decoding the backscatter data packets to the receiver.

5. A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, and wherein the tunable impedance network is configured to reflect the single tone carrier to form a reflected signal;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain, and wherein subsequent to tuning the tunable impedance network, the microcontroller transitions to a downlink mode, and wherein the downlink mode causes receipt of the backscatter data packets.

6. A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, wherein the tunable impedance network is configured to reflect the single tone carrier to form a reflected signal, and wherein the tunable impedance network is a two-stage network, wherein a first stage is associated with coarse tuning and a second stage is associated with fine-tuning, and wherein the second stage covers a step size associated with the first stage;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain.

7. A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, wherein the tunable impedance network is configured to reflect the single tone carrier to form a reflected signal, and wherein the tunable impedance network suppresses self-interface caused by the single tone carrier;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain.

8. A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, wherein the tunable impedance network is configured to reflect the single tone carrier to form a reflected signal, and wherein the reflected signal is configured to cancel a different reflected signal which represents the single tone carrier as reflected by the antenna;
a coupler, wherein the coupler is connected to the antenna, transmitter, receiver, and tunable impedance network, and wherein based on an input of the single tone carrier via the transmitter the coupler is configured to isolate the receiver from the single tone carrier; and a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain.

9. A system configured as a full-duplex backscatter reader, the system comprising:
an antenna, the antenna being operable to simultaneously transmit and receive;
a transmitter configured to output a single tone carrier for transmission via the antenna;
a receiver configured to receive, via the antenna, backscatter data packets from one or more backscatter tags positioned in a real-world environment;
a tunable impedance network comprising a plurality of passive elements, wherein a portion of the passive elements are tunable, and wherein the tunable impedance network is configured to reflect the single tone carrier to form a reflected signal;
a coupler, wherein the coupler is connected to the antenna, transmitter, receiver, and tunable impedance network, and wherein based on an input of the single tone carrier via the transmitter the coupler is configured to isolate the receiver from the single tone carrier; and
a microcontroller, wherein the microcontroller obtains one or more measurements associated with signal power of the single tone carrier at an input of the receiver, wherein the microcontroller adjusts the portion of the passive elements to reduce, via the reflected signal, the signal power in the analog domain,
and wherein based on the input of a particular signal from the antenna, the coupler is configured to isolate the tunable impedance network from the particular signal, wherein the particular signal represents a reflection of the single tone carrier from the antenna, wherein the split particular signal is received by the receiver, and wherein the microcontroller is configured to adjust the portion of passive elements to cancel the split particular signal received by the receiver.

10. An apparatus, wherein the apparatus implements a full-duplex backscatter reader, and wherein the apparatus comprises:
a coupler, the coupler being connected to an antenna, a transmitter, a receiver, and a tunable impedance network, wherein the antenna is operable to simultaneously receive and transmit, wherein the transmitter outputs a carrier signal which is split by the coupler between the antenna and tunable impedance network, and wherein the coupler is configured to isolate the receiver from the carrier signal;
the tunable impedance network, wherein the tunable impedance network comprises a plurality of passive elements, and wherein the passive elements are adjustable; and
a microcontroller, the microcontroller tuning the passive elements to adjust a reflected signal which represents the carrier signal as reflected by the tunable impedance network, wherein the adjusted reflected signal causes, in the analog domain, at least a threshold reduction in signal power of the carrier signal as received at the receiver,
and wherein the antenna receives signals representing one or more backscatter data packets, wherein the receiver is configured to decode the backscatter data packets, wherein the microcontroller sets a value of the carrier signal, and wherein the microcontroller causes tuning of the tunable impedance network prior to receipt of the backscatter data packets.

11. The apparatus of claim 10, wherein the threshold reduction is 78 dB, and wherein the tunable impedance network causes at least the threshold reduction in signal power in the analog domain.

12. The apparatus of claim 10, wherein the passive elements comprise capacitors, and wherein respective capacitances of the capacitors are adjustable.

13. An apparatus, wherein the apparatus implements a full-duplex backscatter reader, and wherein the apparatus comprises:
a coupler, the coupler being connected to an antenna, a transmitter, a receiver, and a tunable impedance network, wherein the antenna is operable to simultaneously receive and transmit, wherein the transmitter outputs a carrier signal which is split by the coupler between the antenna and tunable impedance network, and wherein the coupler is configured to isolate the receiver from the carrier signal;
the tunable impedance network, wherein the tunable impedance network comprises a plurality of passive elements, wherein the passive elements are adjustable, and wherein the tunable impedance network is a two-stage network, wherein a first stage is associated with coarse tuning and a second stage is associated with fine-tuning, and wherein the second stage covers a step size associated with the first stage; and
a microcontroller, the microcontroller tuning the passive elements to adjust a reflected signal which represents the carrier signal as reflected by the tunable impedance network, wherein the adjusted reflected signal causes, in the analog domain, at least a threshold reduction in signal power of the carrier signal as received at the receiver.

14. An apparatus, wherein the apparatus implements a full-duplex backscatter reader, and wherein the apparatus comprises:
a coupler, the coupler being connected to an antenna, a transmitter, a receiver, and a tunable impedance network, wherein the antenna is operable to simultaneously receive and transmit, wherein the transmitter outputs a carrier signal which is split by the coupler between the antenna and tunable impedance network, and wherein the coupler is configured to isolate the receiver from the carrier signal;
the tunable impedance network, wherein the tunable impedance network comprises a plurality of passive elements, and wherein the passive elements are adjustable; and
a microcontroller, the microcontroller tuning the passive elements to adjust a reflected signal which represents the carrier signal as reflected by the tunable impedance network, wherein the adjusted reflected signal causes, in the analog domain, at least a threshold reduction in signal power of the carrier signal as received at the receiver,
and wherein the tunable impedance network suppresses self-interface caused by the carrier signal, and wherein the adjusted reflected signal is configured to cancel a different reflected signal which represents the carrier signal as reflected by the antenna.

15. A method implemented by a full-duplex backscatter system, the method comprising:
- outputting, via a transmitter of the backscatter system, a single tone carrier for transmission via an antenna of the backscatter system;
- tuning, via a microcontroller, a tunable impedance network to reduce self-interference associated with the signal tone carrier by at least a threshold level, wherein the tunable impedance network comprises a plurality of passive elements which are configured to be tuned, wherein the passive elements comprise tunable capacitors, and wherein the self-interference reduction by the threshold level is in the analog domain;
- receiving, via a receiver of the backscatter system and from one or more backscatter tags, backscatter data packets, wherein the backscatter data packets are associated with an offset frequency and are decoded by the receiver.

16. The method of claim 15, wherein the tunable impedance network reduces a signal strength associated with the single tone carrier at the receiver, and wherein the threshold level is 78 dB.

17. The method of claim 15, wherein the tunable impedance network is a two-stage network, wherein a first stage is associated with coarse tuning and a second stage is associated with fine-tuning, and wherein the second stage covers a step size associated with the first stage.

18. The method of claim 15, further comprising:
- splitting, via a coupler, a reflection of the single tone carrier from the antenna between the receiver and the transmitter, wherein the coupler is configured to isolate the tunable impedance network from the reflection,
- and wherein the tunable impedance network is tuned to reduce the split reflection by the threshold level at the receiver.

* * * * *